Nov. 3, 1959 B. A. COUSINO 2,911,215

TAPE FEEDING APPARATUS FOR MAGNETIC SOUND RECORDING AND REPRODUCING MECHANISMS

Filed April 11, 1955 8 Sheets-Sheet 1

INVENTOR
Bernard A. Cousino

BY Mc Coy, Greene + Te Grotenhuis
ATTORNEYS

Nov. 3, 1959 B. A. COUSINO 2,911,215

TAPE FEEDING APPARATUS FOR MAGNETIC SOUND RECORDING AND REPRODUCING MECHANISMS

Filed April 11, 1955 8 Sheets-Sheet 2

INVENTOR
Bernard A. Cousino
BY McCoy, Greene & TeGrotenhuis
ATTORNEYS

INVENTOR
*Bernard A. Cousino*

BY *[signature]*
ATTORNEYS

Nov. 3, 1959 B. A. COUSINO 2,911,215

TAPE FEEDING APPARATUS FOR MAGNETIC SOUND RECORDING AND REPRODUCING MECHANISMS

Filed April 11, 1955 8 Sheets-Sheet 4

INVENTOR
Bernard A. Cousino
BY McCoy, Greene & TeGrotenhuis
ATTORNEYS

INVENTOR
Bernard A. Cousino
BY McCoy, Greene & Te Grotenhuis
ATTORNEYS

INVENTOR
Bernard A. Cousino
BY McCoy, Greene & TeGrotenhuis
ATTORNEYS

INVENTOR
Bernard A. Cousino

BY [signature]
ATTORNEYS

INVENTOR
Bernard A. Cousino
BY McCoy, Greene & TeGrotenhuis
ATTORNEYS

United States Patent Office 2,911,215
Patented Nov. 3, 1959

2,911,215

TAPE FEEDING APPARATUS FOR MAGNETIC SOUND RECORDING AND REPRODUCING MECHANISMS

Bernard A. Cousino, Toledo, Ohio, assignor to Browning Research Corporation, Toledo, Ohio, a corporation of Ohio Application April 11, 1955, Serial No. 500,633

29 Claims. (Cl. 271—2.18)

The present invention relates to magnetic sound tape recording and reproducing devices and more particularly to an improved tape reel and a simple tape storing, threading and feeding mechanism employing removable magazines to enclose the tape. This application is a continuation-in-part of my copending abandoned application Serial No. 461,747, filed October 12, 1954, and entitled "Tape Feeding Apparatus for Magnetic Sound Recording and Reproducing Mechanisms."

Heretofore, transducer devices utilizing a record material, such as magnetic tape or magnetic wire, have been threaded and unthreaded by hand and the reels used to store the record material have been mounted and dismounted by hand. Therefore, they did not compare with the older type record discs which could be loaded into and unloaded from a record player automatically and which, though fragile, could be stored conveniently.

The apparatus of the present invention permits automatic or semi-automatic handling of magnetic sound tapes either in relatively inexpensive or in high quality tape recording and/or playback machines. According to one embodiment of the present invention a simple and inexpensive apparatus is provided for automatically threading, feeding, unthreading, and removing a magnetic tape in response to movement of a single manually or automatically operated control member. Such an apparatus functions efficiently and permits a person to load or thread a recording or playback machine with a magnetic tape without touching the tape, to initiate feeding of the tape and playing of the tape record by moving a control member, to release the tape from the machine by moving a control member, and to remove the tape in a simple manner without touching the same.

Since there is no difficulty in changing records or in feeding the tape where such an apparatus is employed and since threading, feeding and ejecting can be regulated by a single control member, such apparatus would be practical even for use in an automobile by the driver thereof. Since the records may be changed quickly and easily, a tape recording and/or playback machine employing the apparatus of the present invention would be well suited for use in a music vending machine or juke box, in a radio broadcasting studio, or in a battleship or other noisy location where a plurality of different preselected signals or messages are to be relayed by radio.

According to he present invention a coil of magnetic tape, preferably an endless tape, is stored in a removable magazine which may readily be placed on and removed from a sound recording and/or reproducing mechanism. Such magazine is preferably designed to completely enclose the tape when it is not in use and is preferably tamper proof so that the tape is protected against damage due to careless handling of the magazine. Means may be provided to cause relative movement between a portion of the tape and the magazine to expose the tape for engagement with a magnetic head of the machine and with the feed rollers or other tape feeding members. Positioning or threading the tape and initiation of the tape feed may be effected at different times or may be effected substantially at the same time as in the embodiment of the invention referred to above by moving a single control member automatically by means of suitable electrical controls or the like or by moving said control member manually. With such a control member the tape may readily be unthreaded, removed and replaced by moving the control member to an "off" position and replacing the magazine with another magazine containing a different tape.

After a magazine is moved to an operating position adjacent a magnetic head and the tape feeding members of the recording or playback machine, such control member may be moved to cause positioning of the tape between said feed members and against said magnetic head and to cause movement of said feed members against the tape to their tape feeding positions whereby feeding of the tape may be initiated. By moving said control member the tape feed may be discontinued at any time or the magazine may be ejected from its operating position. Another magazine may then be moved adjacent the magnetic head. The magazines or cartridges of the present invention are of simple and inexpensive construction so that it is economically feasible to provide a separate magazine for each magnetic tape.

It is preferable to employ an endless tape reel in the rear portion of each magazine and to provide tape guiding means at the front portion of the magazine for lowering the tape to expose the same. The tape may be exposed in response to movement of the magazine to its operating position or may be exposed by operation of a control member before initiation of the tape feed.

The tape reel employed in each magazine may be of a removable type which maintains the tape in orderly storage and may be of a type which guides the tape to and from the convolutions of the endless tape coil. Such reel may, for example, be of a type which may be used on a maximum number of different types of tape recorders so that a record can be easily made on the tape when it is removed from the magazine.

An object of the present invention is to provide a magazine which facilitates automatic threading and feeding of endless tape and which is adapted to receive a tape reel which may be used on most types of tape recorders whereby signals or messages may readily be recorded on the tape while it is removed from the magazine.

Another object of the present invention is to provide an inexpensive tape threading and tape feeding mechanism which is easily regulated by a single control member.

A further object of the invention is to provide an inexpensive tape feeding mechanism employing inexpensive replaceable magazines and which accurately positions the tape against a surface of each magnetic head and feeds the tape with a minimum amount of friction at a uniform velocity so as to be suitable for high fidelity machines.

A still further object of the invention is to provide a tape threading and feeding apparatus employing inexpensive tamper-proof magazines that protect the tape against damage due to careless handling.

Another object of the invention is to provide a simple inexpensive apparatus for automatically threading, feeding, unthreading, and removing a magnetic tape.

A further object of the invention is to provide a small compact tape threading and feeding apparatus suitable for small inexpensive tape recorders and reproducers as well as for more expensive machines.

Other objects, uses, and advantages of the present invention will become apparent from the following description and claims and from the drawings, in which:

Figure 1:
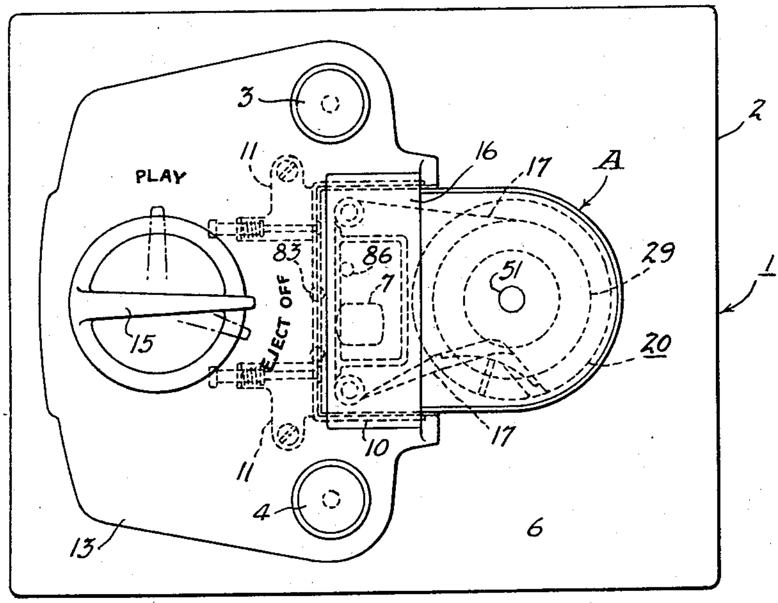
Figure 1 is a top plan view on a reduced scale of a tape recording and/or reproducing mechanism incorporating a tape feeding apparatus according to one embodiment of the present invention with the magazine in operating position and the control knob in "off" position whereby the tape is elevated out of tape feeding position.
Figure 15:
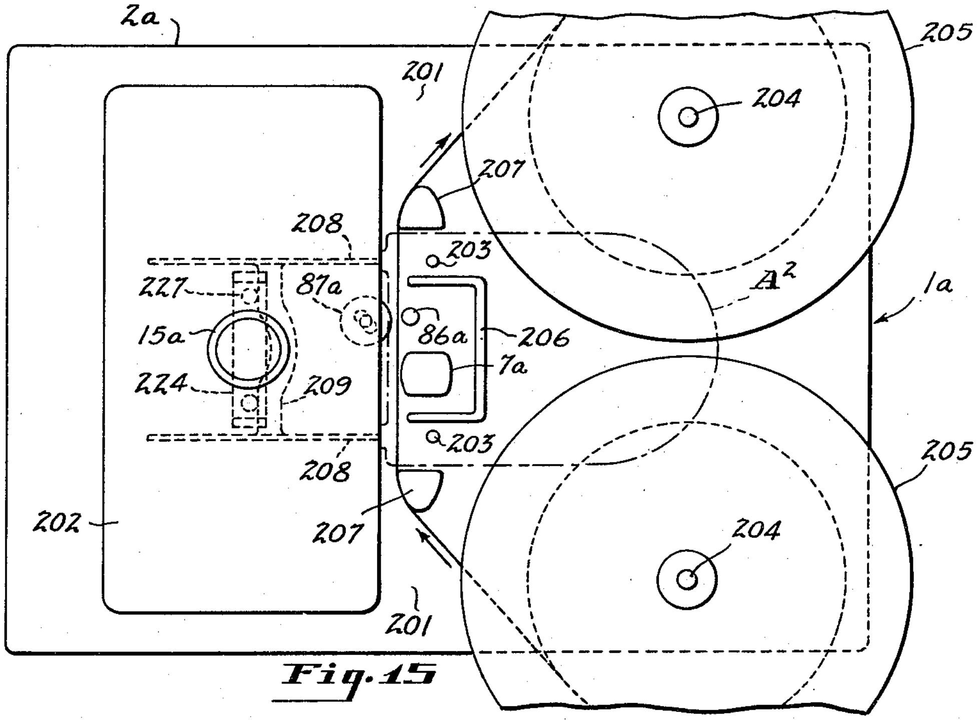
Figure 15 is a top plan view on a reduced scale of a tape recording and/or reproducing mechanism incorporating a tape storing and tape feeding apparatus according to another embodiment of the invention, the operating position of an endless tape magazine or cartridge being shown in dot-dash lines and the operating position of the two conventional tape reels being shown in solid lines.
Figure 16:
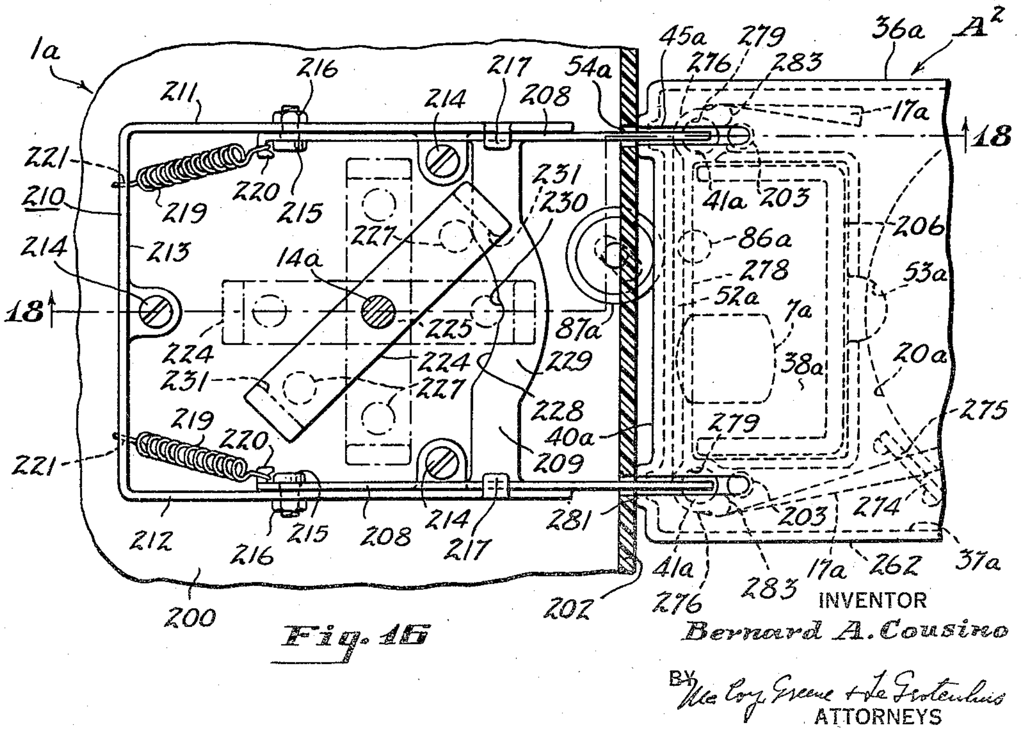
Figures 17, 18, 19, 20, 21, 22, 23:
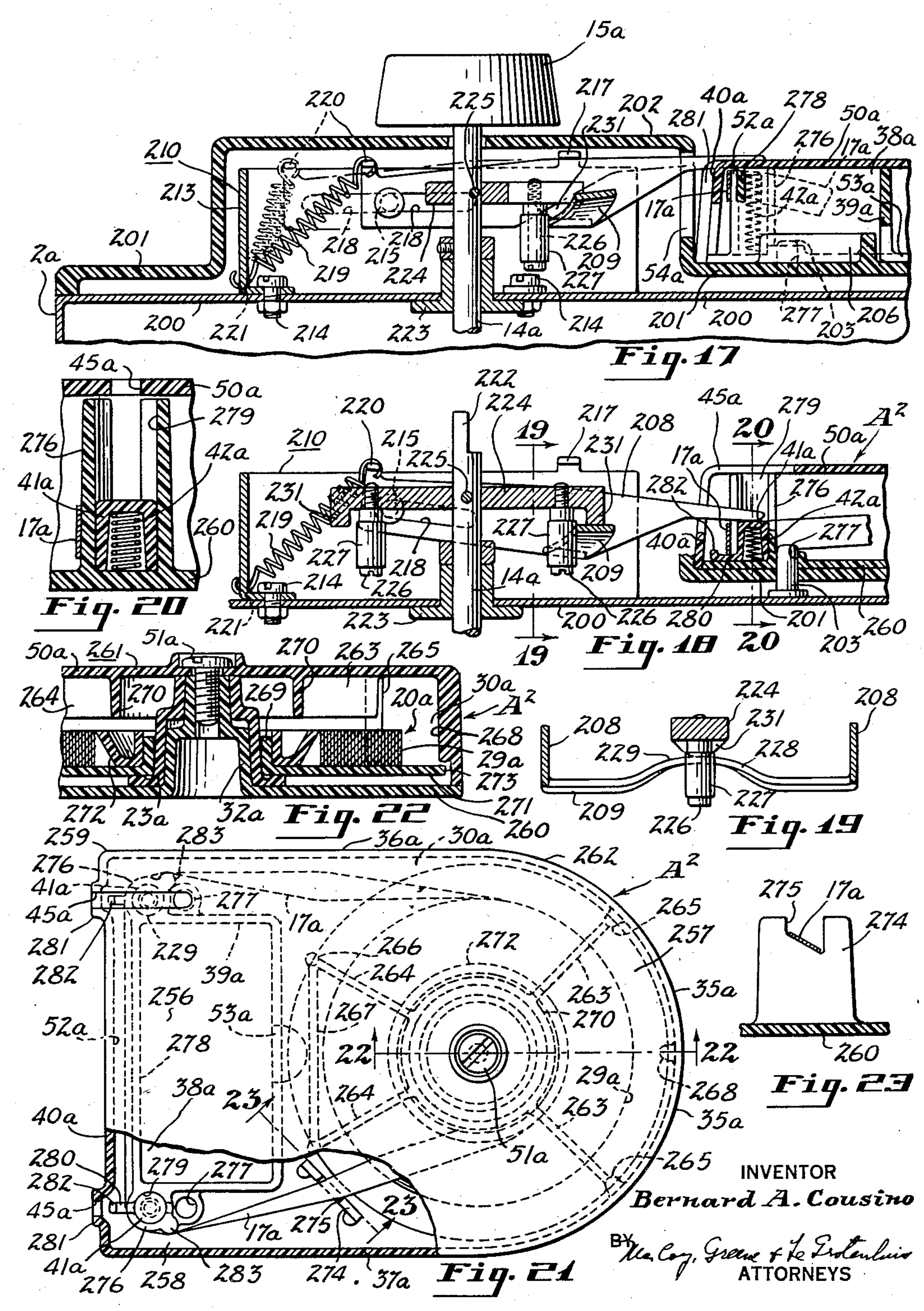
Figure 24:
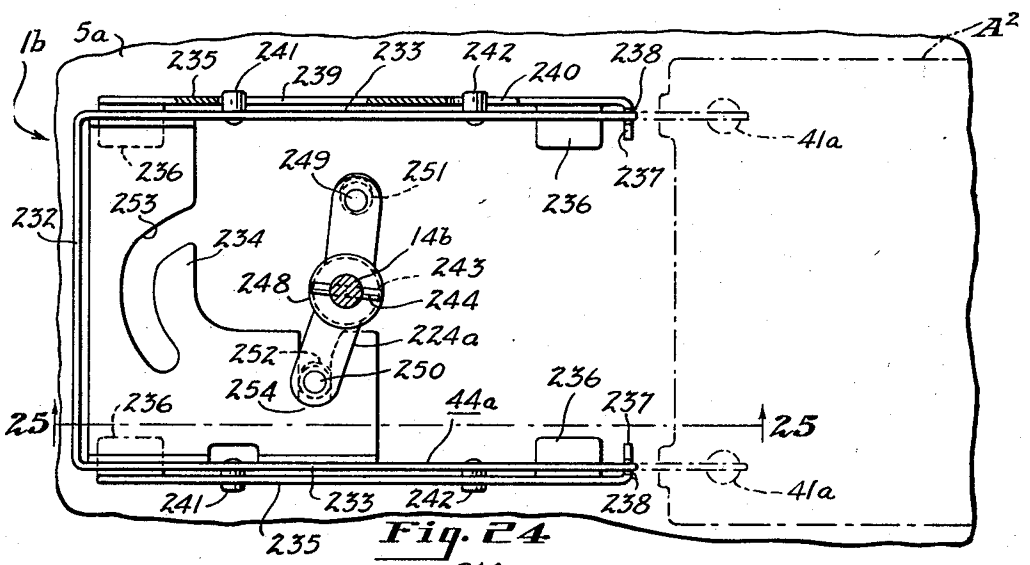
Figures 25, 26, 27, 33, 34:
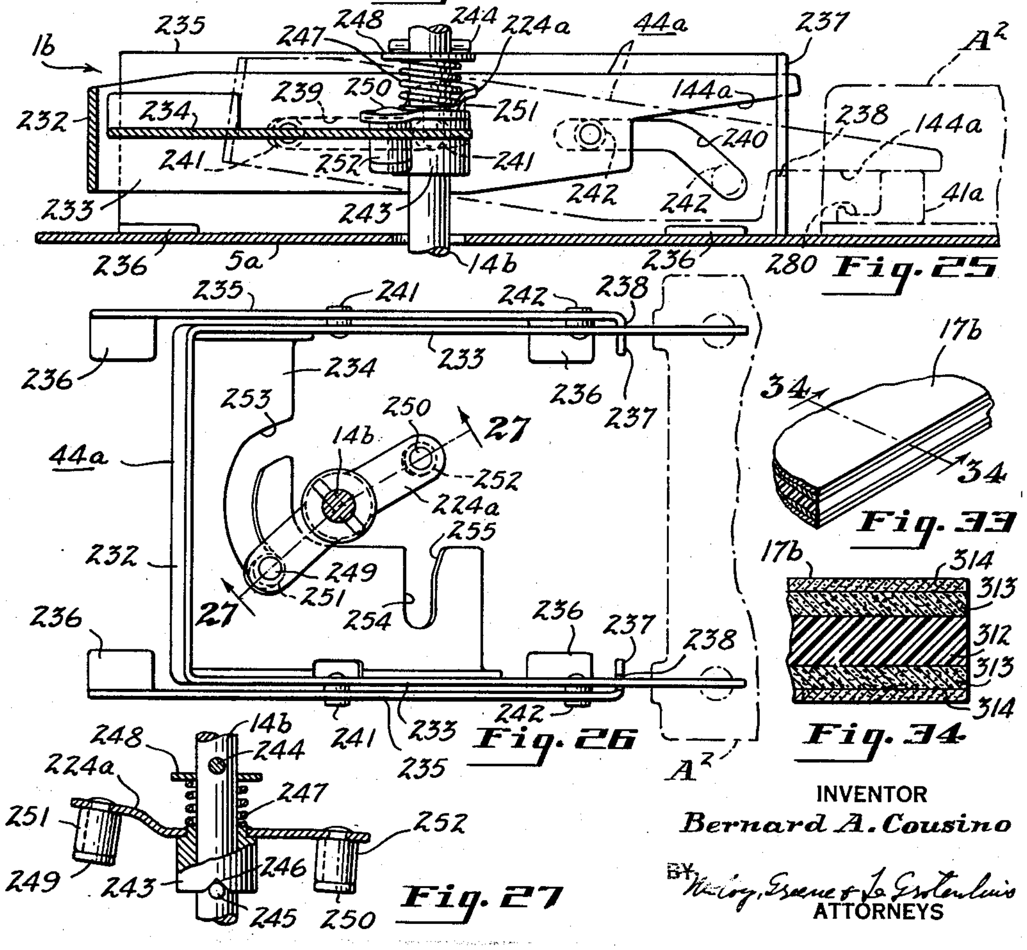
Figure 28:
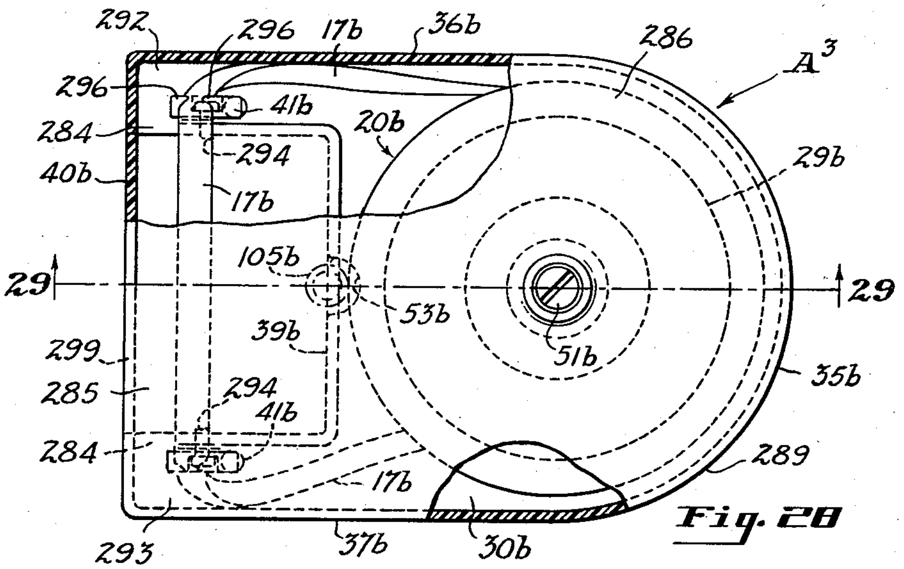
Figures 29, 30, 31, 32:
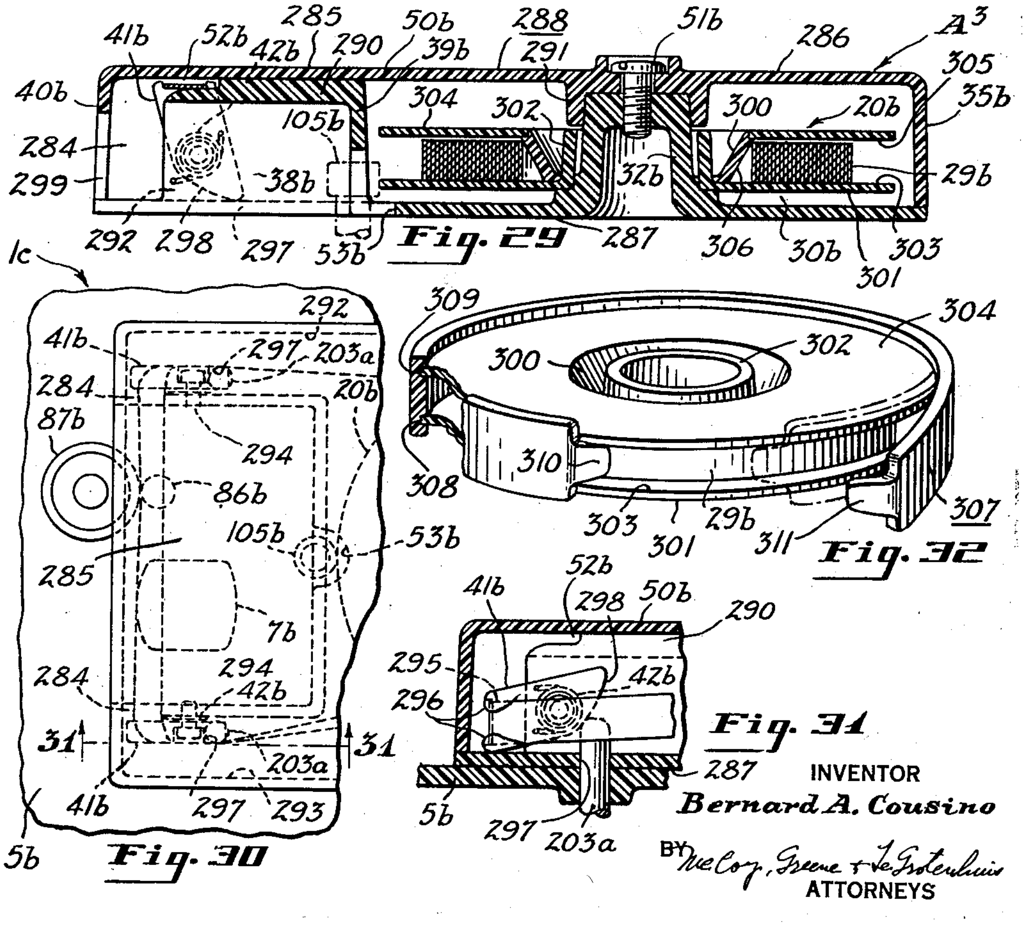

Figure 16 is a fragmentary top plan view with parts broken away and parts removed of the device illustrated in Fig. 15 showing on a larger scale the endless tape magazine of the present invention in operating position and the tape depressing fingers elevated and in their advanced positions, the positions of the control members of the finger operating mechanism when the fingers are depressed and when the fingers are retracted being shown in dot-dash lines;

Figure 17 is a fragmentary longitudinal sectional view taken substantially on a straight line through the axes of the control shaft and the tape reel, the tape-depressing fingers being shown in solid lines in their advanced elevated position and in dot-dash lines in their retracted position;

Figure 18 is a fragmentary longitudinal sectional view with parts removed taken substantially on the line indicated at 18—18 in Fig. 16 and showing the fingers in tape-depressing position;

Figure 19 is a fragmentary transverse vertical sectional view with parts omitted taken substantially on the line 19—19 of Fig. 18 and showing the cam members which control the tape-depressing fingers;

Figure 20 is a fragmentary transverse vertical sectional view of the magazine with parts omitted taken substantially on the line indicated at 20—20 in Fig. 18;

Figure 21 is a top plan view with parts broken away and shown in section of the magazine of the present invention which is shown in Figs. 16 to 20, the tape being in the form of a Mobius loop;

Figure 22 is a fragmentary longitudinal vertical sectional view taken on the line 22—22 of Fig. 21;

Figure 23 is a fragmentary vertical sectional view taken substantially on the line indicated at 23—23 in Fig. 21;

Figure 24 is a fragmentary top plan view similar to Fig. 16 showing a modified form of the present invention with the parts in their positions when the tape-depressing fingers are retracted, the magazine of Figs. 21 to 23 being shown in dot-dash lines in its operating position;

Figure 25 is a fragmentary longitudinal vertical sectional view with parts omitted taken substantially on the line indicated at 25—25 in Fig. 24 and on a slightly larger scale, the vertically movable tape guides in the magazine and the tape-depressing fingers being shown in dot-dash lines in their positions when the tape is lowered;

Figure 26 is a fragmentary top plan view of the embodiment of the invention shown in Figs. 24 and 25 and on the same scale as Fig. 24 illustrating in solid lines the positions of the parts when the tape-depressing fingers are lowered (as indicated in dot-dash lines in Fig. 25), the magazine being shown in dot-dash lines in its operating position;

Figure 27 is a fragmentary vertical sectional view with parts omitted taken substantially on the line indicated at 27—27 in Fig. 26 and on the same scale as Fig. 25;

Figure 28 is a top plan view with parts broken away and shown in horizontal section of another modified form of magazine in which is mounted a modified form of tape reel, the operating position of the reel-driving roller being shown in dot-dash lines;

Figure 29 is a longitudinal vertical sectional view on a larger scale taken substantially on the line indicated at 29—29 in Figure 28, the reel-driving roller being shown in dot-dash lines;

Figure 30 is a fragmentary top plan view showing the magazine or cartridge of Figs. 28 and 29 in operating position on a recording and/or reproducing mechanism of the type shown in Fig. 1, the tape-feeding and reel-driving rollers being shown in operating position during feeding of the tape;

Figure 31 is a fragmentary longitudinal vertical sectional view taken substantially on the line indicated at 31—31 in Fig. 30 and on a larger scale;

Figure 32 is a perspective view with parts broken away and shown in section of the tape reel shown in Figs. 28 to 31 and the expansible member which is attached to the reel when it is not in use in a magazine or cartridge, the normal position of said expansible member on the reel being shown in dot-dash lines;

Figure 33 is a fragmentary perspective view on a large scale of the double-coated magnetic tape; and Figure 34 is a fragmentary vertical sectional view taken on the line 34—34 of Fig. 33.

Throughout the several views of the drawings, parts are drawn substantially to scale so that their relative sizes and shapes will be apparent, and like parts are identified with the same numerals to facilitate a ready understanding of the invention. However, it will be apparent that devices of substantially different size and substantially different type may be made which incorporate inventive concepts of this invention.

The tape threading and feeding mechanism of the present invention is suitable for use with conventional electronic equipment for magnetic sound recording and/or reproducing. While the electrical apparatus is not shown, it will be apparent to those skilled in the art how signals may be passed between a magnetic recording or playback head and an endless tape by establishing magnetic flux interlinkage with successive portions of the tape.

As herein shown, a portable recording and reproducing device 1 is provided having electrical apparatus including a constant speed electric motor, a loudspeaker, an amplifier and other conventional electronic equipment housed within a rectangular box or case 2. The electrical apparatus may be regulated by switches and suitable control knobs to control sound, speed, tone, volume and/or the like and to energize and de-energize the electrical apparatus. As herein shown, the device 1 is provided with a pair of laterally alined upright annular control knobs 3 and 4 located above the case 2 and having shafts projecting downwardly into the case and connected to suitable control mechanisms within the case.

The top portion of the case is formed by a flat horizontal sheet metal plate 5 which has a smooth flat horizontal upper surface 6. In order to obtain recording and/or reproducing in machines of this type, at least one magnetic transducer head or the like must be provided for engaging the magnetic-coated faces of the tapes. The machine shown herein has a single magnetic recording and playback head 7 which projects a short distance above the top surface 6 and is provided with suitable electrical apparatus for establishing magnetic flux interlinkage with successive portions of a magnetic tape 17.

The magnetic transducer head 7 is adjustably supported on the plate 5 by a substantially triangular mounting plate 8 below the plate 5 and by three adjustable attaching screws 9 which project downwardly through circular openings in the plate 5. The attaching screws are received by internally threaded circular openings at the three corners of the plate 8 and may be adjusted to position the plate and the magnetic head carried thereby at the desired location. The head 7 is bolted or otherwise rigidly connected to the plate 8 so that its position may be varied by adjusting the position of the plate 8. If desired springs or other suitable yieldable spacing means may be mounted on the screws 9 between the plate 5 and the plate 8 to bias the plate 8 downwardly.

Figure 3:
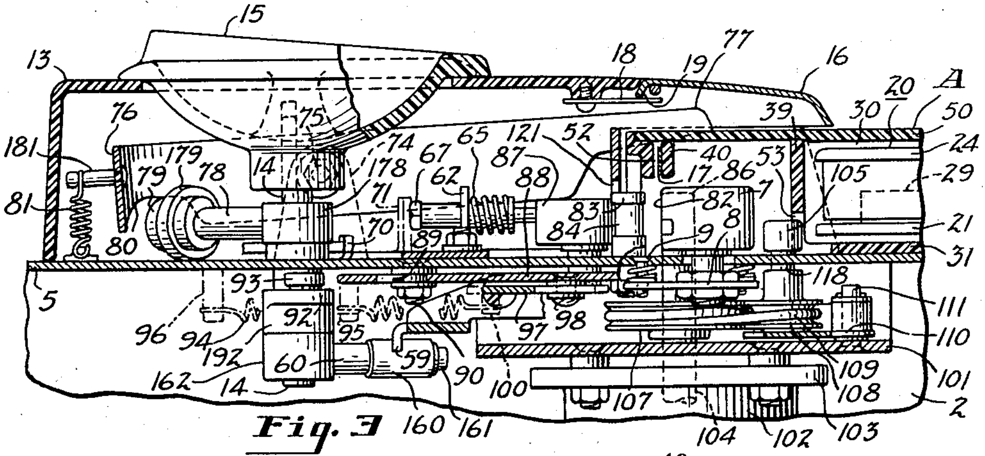
Figure 3 is a fragmentary vertical sectional view taken substantially on the line indicated at 3—3 in Fig. 2 and with parts broken away.

A U-shaped sheet metal guide member 10 is rigidly connected to the plate 5 by means of flanges 11 and forms the vertical walls of a substantially rectangular magazine recess 12, the opposite legs of the member providing parallel ways or guides for the magazine. An attractive symmetrical thin-walled cover 13 is mounted on the case 2 above the plate 5, the guide member 10, and the recess 12 for enclosing the main tape feeding mechanism and the shafts of the knobs 3 and 4. A vertical operating shaft 14 is rotatably mounted on the plate 5 and projects upwardly toward the top wall of the cover 13. An attractive round control knob 15 is rigidly connected to the operating shaft above the cover 13 to rotate the shaft as best shown in Fig. 3.

The cover has a sheet metal lid portion 16 of substantially uniform width and length hinged to a stationary portion of the cover for swinging about a horizontal axis. A cantilever spring 18 engages a downwardly projecting flange 19 on the lid 16 to hold the lid in an open vertically-inclined position or in a substantially horizontal position as shown in Fig. 3 wherein the lid covers the magazine recess 12. The lid may readily be swung to the open position whenever it becomes necessary to obtain access to the magazine recess.

Figure 9:
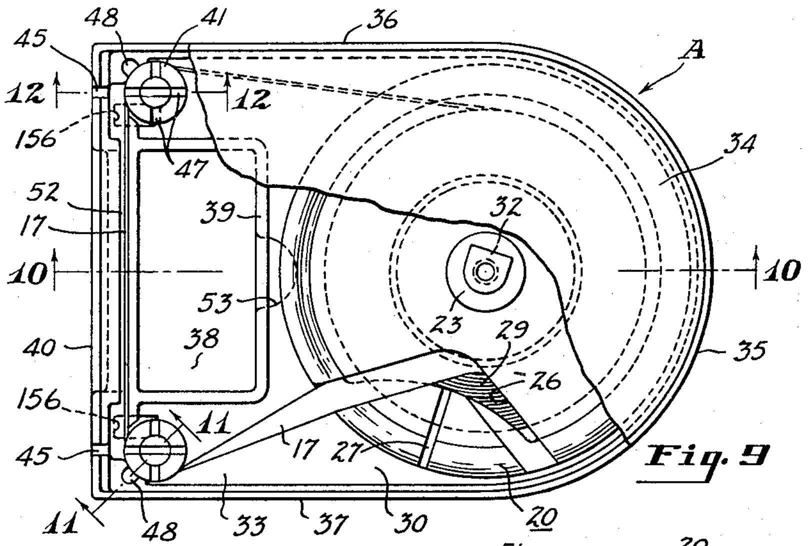
Figure 9 is a top plan view of a small size magazine with its cover partially cut away.
Figures 10, 11, 12, 13, 14:
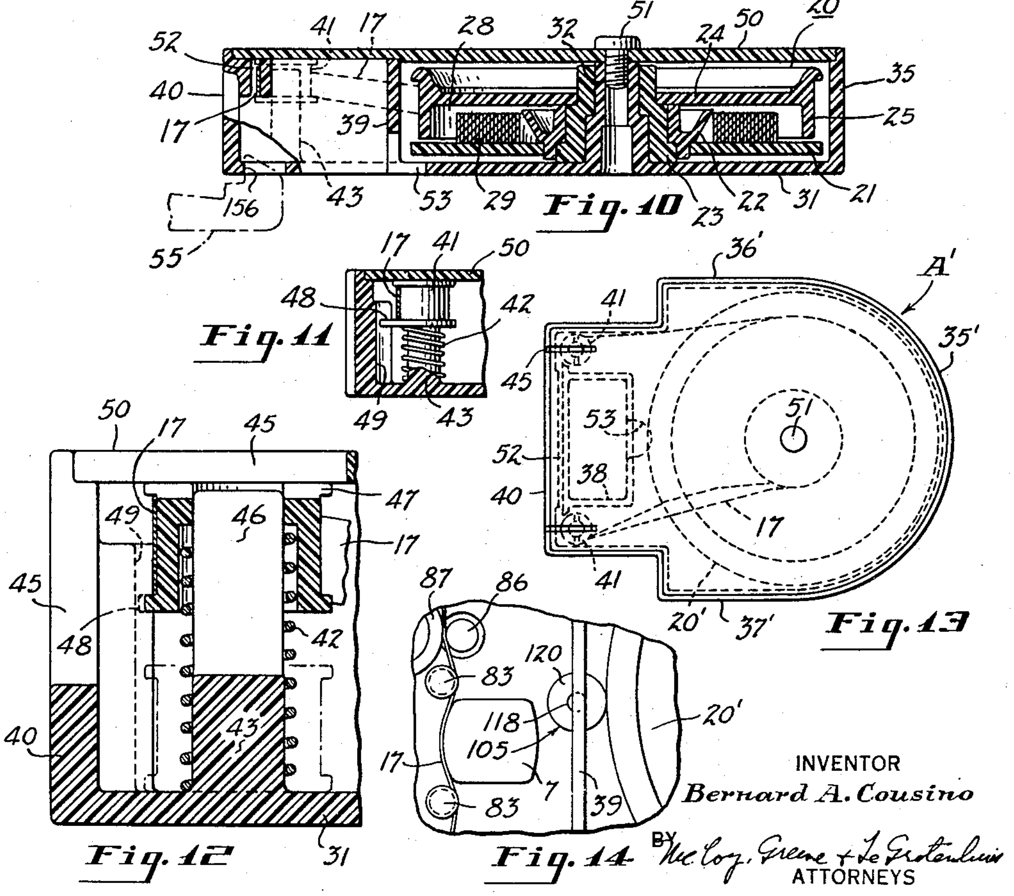
Figure 10 is a vertical sectional view taken substantially on the line indicated at 10—10 in Fig. 9 with parts broken away and shown in section, the normal position of the latch when the magazine is held in operating position being shown in dotted lines.
Figure 11 is a fragmentary vertical sectional view taken substantially on the line indicated at 11—11 in Fig. 9.
Figure 12 is a fragmentary vertical sectional view on an enlarged scale with the tape broken away showing one of the corners of the magazine, the lower position of the tape guide member being shown in dotted lines.
Figure 13 is a top plan view on a reduced scale of a modified form of magazine for larger coils of tape.
Figure 14 is a fragmentary top view with parts removed showing the magazine of Fig. 13 in operating position during feeding of the tape.

A magazine having a front portion with a width and height corresponding to the width and height of the recess 12 may be moved longitudinally on the smooth surface 6 into an operating position as shown in Fig. 1. The rear portion of the magazine may have any suitable shape depending upon the length of the magnetic tape carried and the type of tape reel employed, for example as shown in Figs. 9 and 13. If the tape is unwound from one reel while being wound on another reel, the rear portion of the magazine may have very many different shapes depending on whether the tape reels in the magazine are mounted for rotation about vertical, horizontal or inclined axes. However, if the tape is endless the magazine will contain but one reel and that will be mounted for rotation about a vertical axis. It is preferable to employ a coil of endless tape in the magazine and to mount the coil on a plate or a disc mounted for rotation about a vertical axis so that the tape may be fed from the innermost to the outermost cylindrical convolutions of the coil with a minimum of friction between conjoining convolutions of the coil.

Each incremental portion of the tape 17 is guided and impelled in a path which extends from the innermost coil convolution through the front portion of the magazine to the outermost coil convolution and through successive spirally wound coil convolutions back to the innermost coil convolution. Such path is nearly horizontal due to the fact that the magazine must be moved horizontally into the recess 12 and the fact that the front portion of the magazine which fits the recess is horizontal and at the same elevation as the rear portion of the magazine which supports the tape reel. Since an endless tape reel is preferably supported in a horizontal position for rotation about a vertical axis regardless of which direction the magazine must be moved to reach its operating position in the magazine recess and regardless of the shape or inclination that the front portion of the magazine must have to fit in said recess, it will be apparent that the tape threading and feeding apparatus of the present invention may be modified in many ways and that the magazine employed in any given machine may vary in shape considerably depending on the design of the machine.

As shown in Figs. 1 to 15 each magazine is provided with a tape reel of the type described in my copending abandoned application Serial No. 459,313, filed September 30, 1954, entitled Endless Tape Reel for Magnetic Tape Recording and Reproduction, which is a continuation-in-part of my copending abandoned application Serial No. 324,449, filed December 6, 1952, and entitled Sound Tape Reel. The small magazine A and the large magazine A′ illustrated in the drawings are constructed to receive small and large reels 20 and 20′, respectively. The basic elements of the small and the large reels are a horizontal annular plate or disc 21 for supporting the tape coil, an annular upwardly projecting frustoconical hub 22 rigidly connected to said plate, and an annular bearing member 23 supporting the hub and the plate carried thereby for rotation about the vertical axis of said bearing member.

The interior of the hub 22 has a shape corresponding to the exterior of the bearing member 23 and is provided with smooth cylindrical bearing surfaces which are engageable with the smooth externally cylindrical bearing surfaces of the bearing member. In order to provide an economical construction, the discs of the hub are preferably made of an inexpensive plastic material and the bearing member 23 is preferably made of nylon or other suitable material. The hub 14 is preferably axially tapered and increases in diameter away from the plate 21 or in the direction of tape withdrawal so as to guide the tape from the innermost cylindrical convolution of the coil.

While it is not essential for proper feeding of the tape in the magazine of the type herein shown, it is often preferable to provide stationary guides adjacent the coil of tape so as to direct the tape 17 from the innermost convolution of the coil 29 to the forward portion of the magazine. As herein shown, the reel 20 or 20′ is provided with a thin-walled annular top cover 24 made of plastic or other suitable material and having a marginal skirt 25 surrounding and concentric to the cylindrical convolutions of the coil.

The bearing member has a press fit in a circular opening at the center of the cover 24 so that the reel is held at least by friction in assembled relation and the bearing member supports the cover in stationary horizontal position out of contact with the plate 21. Suitable openings are provided in the top cover to permit movement of the tape 17 into and out of the reel including a symmetrical V-shaped slot 26 terminating at the margin of the cover. The cover is split between the opposite ends of the slot 26 to form a narrow unobstructed opening 27 extending from the center of the slot 26 radially outwardly and downwardly to the bottom of the cover to permit insertion of an endless strip of magnetic tape 17 into the slot 26 without cutting the tape. The portions of the top cover with which the tape engages are suitably shaped as disclosed in said copending application Serial No. 459,313, so as to guide the tape accurately as it leaves the innermost cylindrical convolution of the tape coil.

The tape 17 is spirally wound in an annular recess 28 formed in the reel between the plate 21 and the horizontal central portion of the cover 24 to form an annular coil 29 having contacting cylindrical convolutions which are concentric to and rotatable about the vertical axis of rotation of the plate 21 and the hub 22. The coil 29 rests on the top surface of the plate or disc 21 with its innermost cylindrical convolution substantially in engagement with the tapered hub 22 throughout its circumference, and the innermost convolution preferably has an angular velocity slightly less than the angular velocity of the plate 21 during feeding of the tape so as to reduce the friction between contacting convolutions of the coil whereby the tension required to pull the tape is minimized and the torque required to rotate the coil 29 is substantially uniform.

Since the top of the plate 21 is unobstructed radially outwardly of the hub 22, the tape may move horizontally to the outermost convolution of the coil as it enters the reel. As herein shown, the top surface of the plate 21 is flat.

It will be noted that the tape reel 20 is of general application and is adapted to fit most types of tape recorders. As herein shown the coil of tape is wound in a clockwise direction with an "A" wind (the magnetic coated face of the tape facing radially inwardly in the coil) so that the tape may be easily mounted on a maximum number of conventional tape recorders. With this construction the magnetic head is located between the tape loop and the tape coil during playing so that the tape must pass over the magnetic head during insertion or removal of the magazine. Where the tape has only one magnetic-coated face, this construction facilitates recording of a message in the various types of tape recorders which may happen to be available while the reel is removed from the magazine of the present invention, for example after the original message on the tape has been erased. Although the tape reel complete with its cover requires a magazine of greater height than a reel without the cover and is more costly to manufacture, it is often desirable to include the cover 24 in the reel to facilitate orderly storage of the tape when the tape is in the magazine and when the tape is being used or stored outside of the magazine and to insure proper guiding of the tape during feeding thereof.

It will be understood that the reel 20 employed in the small size magazine A shown in Fig. 9 may be of the same construction as the reel 20′ employed in the larger magazine A′ of Fig. 13 except that it has a smaller diameter and carries a shorter length of tape. It will also be understood that the front portions of both the small and the large magazines shown herein are of substantially the same construction so that both will fit in the recess 12. As shown in Fig. 9, the reel 20 is mounted in a recess or receiver 30 in the rear portion of a magazine or cartridge A with the bearing member 23 slidably mounted in a stationary position on a vertical stud 32 at the center of said recess. The exterior surface of the stud is shaped to conform to the interior surface of the bearing member so as to support the bearing member with its axis in a vertical position and preferably has a non-circular portion engageable with the bearing member to prevent rotation of said member and to insure proper positioning of the reel angularly with respect to the magazine. As herein shown, the stud 32 is annular and integral with the bottom wall 31 of the magazine so that said wall may readily be formed along with the main portions of the magazine in a single plastic mold.

The smaller magazine A shown in Figs. 9 to 12 incorporates the essential features of the present invention. Such a magazine is adapted to enclose completely the tape 17 when it is not being used and is preferably tamper proof so as to prevent damage to the tape by small children or careless persons. Suitable means is provided to cause relative movement between the tape and a portion of the magazine to expose a portion of the tape so that the tape may engage the magnetic head 7 when the magazine is in its operating position.

As herein shown, the magazine or cartridge A has a substantially rectangular front portion 33 and a rounded rear portion 34 having a semi-cylindrical rear wall 35 concentric to the stud 32. As shown herein the wall 35 is spaced a small distance from the margin of the small reel and therefore prevents the use of larger reels in the magazine A. However, a smaller reel may be mounted on the stud 32, if desired.

The rectangular front portion 33 includes parallel side walls 36 and 37 which are shown in Fig. 9 as being tangent to the rear wall 35 and extending forwardly therefrom. Said front portion also includes a substantially rectangular recess 38 in the lower portion thereof midway between the side walls 36 and 37 having a U-shaped upright wall 39 with a height corresponding to that of the walls 35, 36 and 37. The front portion 33 also includes a straight horizontal tape-receiving portion 40 perpendicular to the side walls and extending above the recess 38 to form the front wall of the magazine.

Suitable means may be provided in the magazine for guiding the tape 17 forwardly from the innermost convolution of the tape coil between the parallel portions of the walls 37 and 39 at one side of the magazine to one front corner portion of the magazine, laterally to the other front corner portion of the magazine, and rearwardly between the parallel portions of the walls 36 and 39 at the other side of the magazine to the outermost convolution of the coil. As herein shown, the parallel portions of the walls 36, 37 and 39 form rectangular tape-receiving channels and the tape is mounted on a pair of grooved annular guides 41 for movement upwardly and downwardly in said channels substantially from the bottom wall 31 to the cover 50 of the magazine.

The tape guides 41 may be mounted on the magazine in any suitable manner to slide or swing vertically. As herein shown, the two front corner portions of the magazine A are provided with vertical studs 43 integral with the bottom wall 31 and having externally cylindrical surfaces slidably engaging the internally-cylindrical surfaces of the tape guides 41. The studs extend from the bottom wall substantially to the cover 50 so as to direct the guides 41 vertically. The tape guides are biased upwardly towards the cover 50 by helical compression springs 42 which fit on the studs 43 in annular recesses in the bottom portions of the guides and engage the bottom wall 31 as best shown in Fig. 12. Each spring is adapted to permit lowering of a guide to a position against the bottom wall 31 as shown in dotted lines in Fig. 12 and raising of the guide to a position against the top cover 50 as shown in solid lines in that figure.

In order to support the tape and to prevent movement of the tape axially with respect to the guides 41, each guide is formed with a smoothly-curved tape-receiving groove or slot having a uniform width corresponding to that of the tape 17. The tape guiding groove is preferably annular to facilitate manufacture and preferably provides smooth horizontal guiding surfaces to engage the top and bottom edges of the tape and a smooth externally cylindrical vertical tape-engaging surface to hold the side faces of the straight portion of the tape stretched between the guides 41 in a vertical position.

The straight portion of the tape 17 is supported by the annular guides 41 within a straight narrow tape slot 52 in the upper front portion 40 of the magazine whenever the guides are elevated as shown in Figs. 9 to 12 so that the entire tape is enclosed by the magazine. Since the slot 52 is very narrow and substantially completely covers the tape therein, the magazine is substantially tamper proof and the tape is protected against careless handling.

The magazine is provided with a flat top cover plate 50 which extends over the front and rear portions 33 and 34 of the magazine including the external recess 38 and the internal recess 30 to cover the entire length of tape. Such cover plate may be removed to remove the tape from the guides, to remove the reel 20 from the recess 30, and to remove the guides 41 and the springs 42 from the studs 43 so as to permit replacement of worn parts or the insertion of a different tape reel, with or without a reel cover 24. Of course the magazine may have a height less than that shown in the drawing if the reel cover 24 is omitted and/or the stationary tape guides adjacent the coil are located on the magazine cover or the wall 39 instead of on the cover 24.

While the magazine cover 50 is removable, it is often desirable to construct the magazine so that said cover cannot readily be removed by unauthorized persons or young children who might damage the tape. As herein shown, the stud 32 is threaded internally to receive a screw 51 which detachably secures the cover plate 50 to the non-removable portions of the magazine. The head of the screw is preferably designed to be opened by a special tool and not by the ordinary household screwdriver so that the magazine is tamper proof.

Any suitable means may be provided for causing relative movement between the front portion 40 of the magazine and the tape therein to expose the tape. As herein shown, the portion 40 is stationary and the tape is moved relative to the magazine by a pivotally mounted U-shaped lever 44 having a flat lower surface 144 at each end thereof engageable with one of the tape guides 41. The lever 44 engages the centers of the tape guides and moves the guides downwardly in unison until they are a predetermined distance below the cover 50 and the tape is exposed in the recess 38 below the tape-receiving portion 40 of the magazine.

Narrow longitudinal slots 45 are provided at each side of the magazine to permit the necessary movement of the lever 44 through the cover 50 and the front portion of the magazine, and slots 54 of the same width are provided in the laterally extending portion of the magazine guide 10 for the same purpose. A slot 46 is provided in the middle of each stud 43 in longitudinal alinement with the slots 45 and 54 to receive the lever 44 as it moves to its lowermost position. The top of each tape guide 41 is preferably provided with a shallow slot 47 for receiving the lever 44, the bottom of said slot being horizontal and parallel to the bottom surface of the tape guide. The surfaces 144 are preferably horizontal when the lever 44 is in its lowermost position so that the guides 41 will be held in a substantially horizontal position as they are lowered even where they have a loose fit on the studs 43.

The tape guides 41 preferably resist rotation at least partially so that they will resist movement of the tape slightly and will hold the tape therebetween substantially straight. As herein shown, each guide 41 is provided with a radial lug or ear 48 and each front corner portion of the magazine is provided with a vertical slot 49 for slidably receiving the lug 48 and for preventing rotation of the lug and the guide 41 rigidly connected thereto. The slots 49 have substantially the same horizontal cross sectional shape as the lugs 48 and permit free sliding movement of the lugs vertically.

If desired the disc 21 may be motor driven as will be hereinafter described to reduce the friction between contacting convolutions of the tape coil. As herein shown each magazine is provided with a notch 53 in the walls 31 and 39 preferably halfway between the opposite sides of the magazine to receive a disc driving roller 105 to be hereinafter described. However, with the small magazine A using a short length of tape, it is usually unnecessary to drive the coil-carrying disc 21 since there is a relatively small amount of friction between convolutions of the coil 29 especially where the magnetic tape is coated with a thin uniform and continuous graphite film, for example as disclosed in the aforesaid continuation-in-part application Serial No. 459,313, so as to effectively conduct static electricity along its length.

The large magazine or cartridge A′ is the same as the small magazine A except that the rear portion is bulged radially outwardly to accommodate a larger tape reel and a longer length of tape. The large magazine A′ shaped as shown in Figs. 13 and 14 can handle about three times the length of tape normally handled by the small magazine A. Where the coil carrying disc and the tape reel have a diameter of about 4½ to 5 inches, it has been found that a magnetic tape may be easily handled with a length greater than 600 feet particularly where a thin cellulose acetate tape is employed. The reel may be driven by means of the driving roll 105 as shown in Fig. 15 to minimize the friction between convolutions of the tape coil particularly where the endless tapes have lengths from 600 to 1200 feet.

The front portion of the large magazine A′ is the same as the front portion 33 of the small magazine A so as to fit in the magazine recess 12, but the rear portion of the large magazine is larger than the rear portion 34 of the small magazine to accommodate a larger tape reel 20′. The reel 20, is the same as the smaller reel 20 previously described except that it has a larger diameter and holds a greater length of the tape. As herein shown, the margins of the rear portion of the larger magazine A′ are defined by a semi-cylindrical rear wall 35′ and outwardly bulged side walls 36′ and 37′ similar to the walls 35, 36 and 37 of the smaller magazine A.

It will be understood that the magazine A or A′ or a magazine of any other suitable size may be slid longitudinally on the smooth horizontal top surface 6 into the magazine recess 12 to a predetermined operating position. The parallel longitudinal leg portions of the guide 10 slidably engage opposite sides of the magazine to guide it towards its operating position and the lateral portion of the guide 10 may serve as a stop to halt the movement of the magazine when it reaches said operating position.

Figures 6, 7, 8:
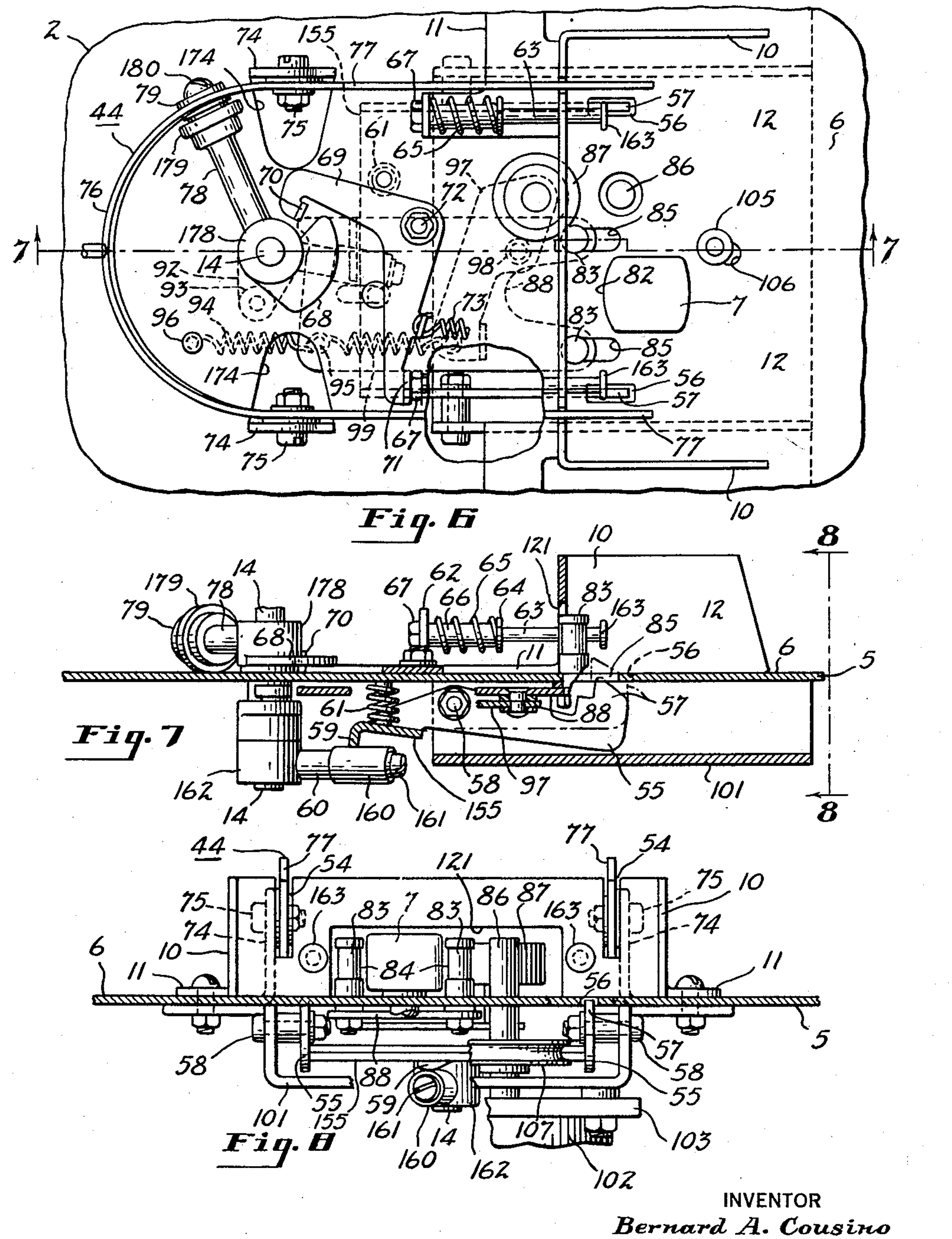
Figure 6 is a fragmentary top view with parts removed and with parts broken away showing the position of the parts when the control knob is in "eject" position and the magazine is removed.
Figure 7 is a fragmentary vertical sectional view partly in section with parts braken away and with parts omitted taken substantially on the line indicated at 7—7 in Fig. 6, the upper position of the magazine latch being shown in dotted lines.
Figure 8 is a fragmentary vertical sectional view with parts broken away and with parts omitted taken substantially on the line indicated at 8—8 in Fig. 7.

It is preferable to provide detachable means for locking or holding the magazine in its operating position within the recess 12. As herein shown, the main tape feeding mechanism of the case 2 includes a pair of parallel longitudinal laterally alined latches 55 which are rigidly connected to each other for tilting movement in unison by a lateral bar 153 as best shown in Figs. 7 and 8. The latches project through narrow longitudinal slots 56 in the top plate 5 and are adapted to move into and out of laterally spaced narrow slots 156 in the bottom wall 31 of the magazine. The slots 156 aline with the slots 56 when the magazine is moved into its operating position, and the forward marginal edges of the former slots are engageable with the latches 55 to prevent movement of the magazine out of said operating position.

The latches are pivotally connected to a supporting plate 101 that is bolted to the top plate 5 by means of laterally alined pivot pins or bolts 58 as shown in Fig. 8 so that the triangular magazine-engaging portions 57 at the rear ends of the latches swing about a horizontal axis into and out of the slots 156. Any suitable means may be provided to swing the latches into and out of locking position. As herein shown, the rear end portions 57 are moved above the top surface 6 into locking position and below said top surface into released position by a cam means responsive to rotation of the control knob 15 and the control shaft 14. Such cam means includes a laterally extending cam lug 59 on the bar 155 midway between its ends, a cam roller 160 which engages the cam surface of the lug to actuate the latches, and a compression spring 61 biasing the roller against the lug. The roller 160 is rotatably mounted on a radial cam arm or shaft 60 having a hub or boss 162 rigidly connected to the bottom portion of the control shaft 14 and is held on the arm by a screw 161. The angular position of the arm 60 may readily be adjusted so that the latch portions 57 are moved into locking position at any predetermined angular position of the control shaft 14.

Suitable means may be provided for holding the magazine against the front of the latch portions 57 and/or for ejecting the magazine rearwardly away from the guide 10 and the magnetic head 7. As herein shown, both functions are performed by a pair of laterally-spaced parallel spring-pressed ejector rods 63 which bias the magazine rearwardly and yieldably resist movement of the magazine forwardly into its operating position. Each ejector rod 63 is mounted in a horizontal position for longitudinal sliding movement in longitudinally alined openings in the lateral portion of the guide 10 and in a vertical lug 62 bent upwardly from a flange portion 11 of the guide.

Each rod preferably has an enlarged head 163 at its rear end engageable with the rear face of the guide 10 to limit forward movement of the rod away from the magnetic head 7. Each ejector rod 63 has a forward portion 66 which slides through one of the lugs 62 and which is annular and internally threaded to receive a bolt 67 whose head is engageable with the lug to limit rearward movement of the ejector rod toward the head 7. Each rod is provided with a collar 64 at the rear end of the annular portion 66 and an ejector spring 65 surrounding said annular portion and interposed between the lug 62 and the collar 64 to bias the ejector rod rearwardly.

As herein shown, the ejector rods 63 are substantially vertically alined with the latches 55 and are adjacent the inside faces of the lever 44 so as to engage the front corner portions of the magazine on opposite sides of the recess 38. When the magazine is moved forwardly in the recess 12 against the ejector rod heads 163, the springs 65 are compressed and the heads 163 are moved against the guide 10 to halt the magazine when it reaches its operating position.

During movement of the magazine forwardly to its operating position, the bottom of the magazine, which is engageable with the smooth top surface 6, engages the inclined rear surfaces of the triangular latch portions 57 to depress the same below said top surface and to compress the latch springs 61. When the magazine reaches its operating position the latches register with the slots 156 of the magazine and the compression springs 61 expand to move the latches into locking position in said slots and to move the cam roller 160 back into arrangement with the cam lug 59.

When the control knob 15 is rotated clockwise to "eject" position, the cam roller engages the lug to move the latch portions 57 out of the slots 156 below the surface 6 and to release the latches. Upon release of the magazine the compression springs 65 expand and the rods 63 eject the magazine rearwardly away from the main tape feed mechanism and the magnetic head of the case 2 to facilitate removal of the magazine.

In order to avoid undesirable counterclockwise rotation of the control shaft 14, it is desirable to provide releasable stop means for preventing such rotation when there is no magazine in the magazine recess 12. It is preferable to provide stop means for the control shaft 14 which is released in response to forward movement of an ejector rod due to forward movement of a magazine to its operating position in the recess 12. As herein shown, the shaft 14 has a radial stop plate or lug 68 parallel to and above the plate 5 and rigidly connected to the shaft 14 for rotation therewith. The lug 68 provides a stop shoulder which engages a horizontal bell crank detent 69 above the plate 5 to prevent counterclockwise movement or movement of the control knob 15 from the "off" towards the "play" position when the recess 12 is empty. The detent has a stop portion 70 at its front end movable into and out of the path of movement of the lug 68 and an upturned portion 71 at its opposite end in the path of movement of and engaging the head 67 of one of the ejector rods 63. A vertical pivot pin or bolt 72 is provided on the detent between the ends 70 and 71 thereof to connect the detent to the plate 5 for horizontal swinging movement above the plate.

Suitable means is provided for biasing the detent 69 and the stop portion 70 thereof towards a locking position in the path of movement of the lug 68 including a tension spring 73 connected to the plate 5 and extending rearwardly from a portion of the detent between the pivot pin 72 and the rod-engaging portion 71 for biasing the detent in a counterclockwise direction. The spring 73 holds the detent against one of the ejector rods and assists the spring 65 in biasing the rod rearwardly towards the magazine. When the ejector rod is moved forwardly due to sliding of the magazine A or A' on the top surface 6 to its operating position in the recess 12, the bolt head at 67 engages the portion 71 of the detent to swing the detent clockwise about its vertical axis to a released position out of the path of movement of the stop shoulder at 68 whereby the control shaft 14 is free to rotate counterclockwise towards "play" position. When the magazine is removed from the recess 12, the spring 73 returns the detent to its normal locking position in the path of movement of the lug 68 to prevent counterclockwise rotation of the control shaft.

A pair of ears 74 are cut in the top plate 5 and are bent upwardly to form vertical supporting lugs for the U-shaped lever 44 leaving recesses 174 in the plate 5. The lever 44 is pivotally connected to the lugs 74 for vertical swinging movement about a horizontal axis adjacent the control shaft 14 by a pair of laterally alined horizontal pivot pins or bolts 75 both located the same distance from the guide 10. The pivotal axis of the lever 44 is parallel to the front portion of the magazine and is preferably located a distance above the horizontal plate 5 at least about equal to the height of the surface 144 when the lever is in its lowermost position and not substantially greater than the height of said surface when the lever is in its uppermost position so that said surface will not move a substantial distance out of a horizontal position. The pivotal axis of the lever is also preferably spaced a substantial distance horizontally from the tape guide engaging portion of the surface 144 for the same reason.

As herein shown, the lever 44 comprises a metal strip having a semi-cylindrical forward portion 76 concentric to the shaft 14 and straight side leg portions 77 parallel to the sides of the guide 10 and having flat surfaces 144 engageable with the tape guide members 41. Any suitable means may be provided for tilting the lever 44 about its horizontal axis in response to movement of the control knob 15. As herein shown, the shaft 14 is rigidly connected to the hub or boss 178 of a horizontal radial arm 78. A cylindrical supporting roller 179 and a cylindrical cam roller 79 are mounted on the outer end portion of the arm 78 for rotation about the horizontal axis of said arm and are held against axial movement on the arm by suitable means including a screw 180. The roller 179 is located inwardly of the lever portion 76 and has such a diameter that it rolls on the smooth top surface 6, but the roller 79 preferably has a smaller diameter so that it is held out of contact with said surface.

The semi-circular portion 76 of the lever 44 has a cam surface 80 on the bottom edge thereof that engages the cam roller 79 so as to locate the angular position of the lever at each angular position of the arm 78. The surface 80 is shaped to raise the portion 76 when the control knob 15 is turned to "play" position so as to expose the tape 17 in the recess 38. Any suitable means may be provided to lower the portion 76 as the control knob is turned clockwise from the "play" to the "off" position so as to permit elevating of the tape out of the recess 38. As herein shown, the lever 44 and the cam surface 80 thereof are biased angularly against the cam roller 79 by means of a tension spring 81 which is connected to the top plate forwardly of the lever 44 and out of the path of movement of the radial arm 78 and its screw 180. The spring extends upwardly from the top plate and is connected to a stud 181 projecting forwardly from the semi-circular portion 76. It will be understood that any other suitable spring means may be employed for yieldably resisting movement of the lever 44 by the arm 78.

It will be seen that the portion of the tape between the tape guides 41 may be moved vertically between an upper position within the tape slot 51 and an exposed position within the recess 38. As herein shown, one magnetic recording and reproducing head 7 is provided, said magnetic head being adapted for an "A" wind and so located on the case 2 as to be in the recess 38 between the parallel portions of the wall 39 and rearwardly of the tape slot 52 when the magazine A or A′ is moved into its operating position in the magazine recess 12. The head is shown as being relatively small and of substantially rectangular cross section so that it may readily fit in the recess 38 without touching the wall 39. The top of the magnetic head 7 is lower than the bottom of the shielding wall formed by the narrow central part of the front portion 40 and the bottom of the tape when the tape is in its uppermost position so that the magazine may slide on the surface 6 over the top of the magnetic head. The portion of the tape suspended in its uppermost position between the guides 41 will therefore clear the head 7 as the magazine is moved into or out of its operating position.

When the magazine is in its operating position and the tape is exposed due to movement of the lever 44 and lowering of the tape guides 41, the tape is adjacent the vertical front face 82 of the magnetic head 7. This face is very smooth and is preferably curved so that the tape may be held firmly against the head. The magnetic head may be provided with a channel or groove of a width to receive and to guide the tape, but as herein shown the tape-engaging face 82 of the head 7 is in the form of an arc of a smooth cylindrical surface.

The magnetic head 7 may have various numbers of tracks thereon along its front face 82 for establishing flux interlinkage with successive increments of the tape. For example, the playing time of a given length of tape might be multiplied by recording messages at several different elevations along the length of the tape and establishing flux interlinkage first at one elevation and then at another. With suitable electrical apparatus this could be done without physically moving the body of the head 7 and the vertical shifting could be effected either manually or automatically by means of switches or the like. In some machines a full-track head could be used, but it is probably preferable to employ a half-track head which effects only about half of the width of the tape at any time so that a Mobius loop may be employed to advantage. Such a loop may be formed from an ordinary loop by cutting the tape, giving one end thereof a half twist, and splicing the tape. By using the Mobius loop in the magazine placed in the recess 12 (for example, the magazine of Fig. 21), the playing time of any given length of tape can be doubled. The possible advantages of the Mobius loop with a very short length of tape or a rapidly moving tape having a very small playing time or with an extremely long tape (1200 feet, for example) should be apparent. However, the Mobius loop usually requires a double-coated tape (having a magnetic coating on both of its faces).

A guide pin or any other suitable means may be provided for positioning the tape against a magnetic head after the tape has been exposed. Means may be provided for engaging closely spaced portions of the tape near a magnetic head so as to cause the tape to conform to the shape of the smooth tape-engaging portion of that head. Where one magnetic head is provided, a tape advancing or tape guiding means such as a guide pin may be provided adjacent each side of the magnetic head. A suitable groove may be provided to position the tape vertically on the magnetic head. Such a groove may be provided in the guide pin which positions the tape against the magnetic head. As herein shown, the means for accurately positioning the tape against the smoothly curved face 82 of the magnetic pick-up head 7 comprises a pair of laterally alined vertical metal guide pins 83 mounted for longitudinal reciprocation on the plate 5 into and out of an operating position in engagement with the front face of the tape. Each guide pin is provided with a tape groove 84 having a smoothly curved vertical surface and having a uniform width substantially equal to that of the tape strip so as to position the tape accurately against the head 7 a predetermined distance above the top surface 6 when in its rearward operating position. As herein shown, the guide pins are circular in horizontal cross-section and the grooves 84 are of uniform radial depth to provide a smooth cylindrical tape-engaging vertical surface and smooth horizontal top and bottom guiding surfaces.

The grooves 84 are horizontally alined and are located the same distance from the top surface 6 so as to support the tape parallel to said surface when moved to their rearward operating position. The smooth bottom horizontal surfaces of the annular grooves in the plastic tape guides 41 are preferably substantially horizontally alined with those in the guide pins 83 when said guides are in their lowermost position against the bottom wall 31 of the magazine so that the guides support the tape in horizontal alinement with the grooves 84 and with its bottom edge parallel to the top surface 6 as the guide pins are moved horizontally toward and away from the tape. As herein shown, the annular grooves in the tape guiding members 41 and 83 are located so as to support the tape at substantially the same height as the coil 29 so that the bottom edge of the tape is substantially horizontal as it moves from the magnetic head to the outermost convolution of the coil 29.

Figures 4, 5:
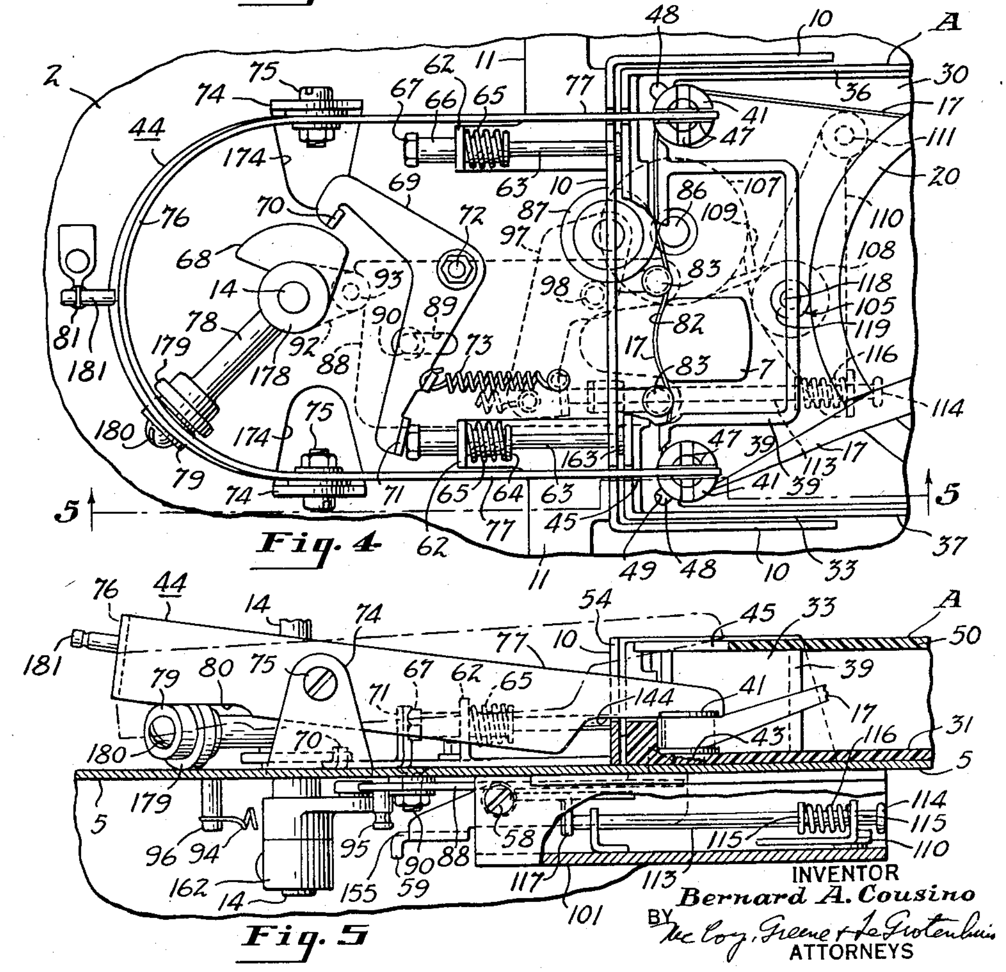
Figure 4 is a fragmentary top view similar to Fig. 2 and with parts removed showing the position of the parts during feeding of the tape when the main control knob is in "play" position.
Figure 5 is a fragmentary vertical sectional view taken substantially on the line indicated at 5—5 in Fig. 4 and with parts broken away and shown in section.

The top plate 5 is provided with a pair of laterally alined, longitudinally elongated grooves 85 of uniform width and of the same length on opposite sides of the magnetic head 7 and having their rear edges adjacent the opposite front corner portions of said head. The front and rear edges of the grooves are preferably transversely alined and preferably engage the guide pins when they are in their advanced and retracted positions to limit the longitudinal movement of the pins. The longitudinal side edges of the grooves 85 are parallel to the longitudinal portions of the guide 10 and slidably engage the pins to guide them in a longitudinal direction while preventing transverse movement thereof. As shown in the drawings, the axes of the guide pins 83 are always located in a transverse vertical plane perpendicular to the longitudinal portions of the guide 10. The guide pins have a rearmost operating position adjacent the opposite ends of the surface 82 so as to hold the tape substantially as shown in Fig. 4 in engagement with said surface substantially throughout the length thereof.

In the tape feeding mechanism illustrated in the drawings, the portion of the tape engaging the guide pins 83 is located a short distance rearwardly of the laterally extending portions of the tape engaging the foremost portions of the head 7 and the guides 41 when said pins are in their rearmost positions, and the laterally extending portions of the tape engaging the foremost portions of the guides 41 are substantially in alignment with the portion of the tape engaging the foremost portion of said head whereby the guide pins may be moved out of contact with the tape and the portion of the tape between the guides 41 may be raised and lowered before or after use without objectionable interference due to the tape striking the magnetic head or the guide pins.

As the tape supported between the plastic tape guides 41 is raised and lowered it moves between a vertical driving roller or capstan 86 and a freely rotatable rubber covered idler roller 87. The idler roller may be located on the same side of the tape as the guide pins 83 so that it can be moved horizontally by the same mechanism and in the same direction as the pins 83. Like the magnetic head 7, the driving roller has a top surface located closer to the top surface 6 than the portion of the magazine movable horizontally thereover and is preferably fixed against horizontal movement so that the magazine can be slid on the surface 6 into the recess 12 until the driving roller is in the recess 38 forwardly of the tape suspended in the slot 52. The roller 86 is preferably formed like the guide pins 83 by accurately machining a piece of metal, but unlike the non-rotatable guide pins the roller is continuously driven by an electric motor. Starting and stopping of the tape feed is effected by moving the idler roller 87 horizontally into and out of gripping engagement with the tape. The rollers 86 and 87 are rotatable about vertical axes and are separated when the guide pins 83 are moved forwardly so that they do not interfere with vertical movement of the tape by the guides 41. The idler roller 87 may be located on the same side of the tape as the guide pins 83.

As herein shown, the guide pins 83 and the idler roller 87 are movable horizontally through suitable slots in the plate 5 and through a large rectangular slot 121 in the transverse portion of the guide wall 10 midway between the lever slots 54 and the ejector rods 63. The slot 121 has a height above the surface 6 greater than that of the guide pins or the idler roller as best shown in Fig. 8 which height is substantially the same as that of the bottom of the straight portion 40 of the magazine. Such a construction permits movement of the guide pins and the idler into the recess 38 of the magazine without striking the magazine.

The guide pins 83 are rigidly connected to the rear end of a bifurcated flat plate or carriage 88 which is mounted below the plate 5 for longitudinal horizontal reciprocation parallel to the magazine engaging portions of the guide 10. A longitudinally elongated slot 89 is provided in the plate 88 which receives a guide pin or bolt 90 that is rigidly connected to the top plate 5. The slot has parallel sides which slidably engage the bolt to assist the slots 85 in guiding the plate 88 longitudinally.

Washers or other suitable means may be carried by the bolt 90 to prevent movement of the forward end of the plate 88 vertically toward or away from the top plate 5. Likewise, the tape guiding pins 83 have radially enlarged portions or the like of greater diameter than the width of the slots 85 which slidably engage the top and bottom of the plate 5 along the margins of said slots to prevent movement of the rear end of the carriage 88 and the guide pins 83 carried thereby vertically toward or away from the plate 5. Movement of the carriage is therefore limited to sliding in a horizontal plane.

Any suitable means may be provided for moving the carriage 88 longitudinally to cause positioning of the tape against the magnetic head 7 while the tape is advanced by the feed rollers 86 and 87. Such means preferably moves the plate forwardly in response to rotation of the control shaft 14 counterclockwise towards the "play" position. As herein shown, the front end of the plate 88 is provided with a cam surface 91 which cooperates with a cam lug 92 carried by the shaft 14 to move the plate longitudinally toward and away from the magnetic head, the parallel slots 85 and 89 having a sufficient length to permit such movement. The lug 92 has a boss or hub 192 at one end thereof that is rigidly connected to the shaft 14 just above the hub 162 and has a cylindrical cam roller 93 supported at its opposite end for rotation about a vertical axis and engageable with the vertical surface 91. A tension spring 94 or other suitable means may be provided for biasing the carriage 88 forwardly and for yieldably resisting rearward movement of the carriage by the roller 93. As herein shown, the carriage is provided with a downwardly extending pin 95 and the plate 5 is provided with a downwardly extending pin 96 for connection to the spring 94. The pins are rigidly connected to the plates and the spring extends between the pins to yieldably resist separating movement thereof due to rearward movement of the carriage.

The idler roller 87 may be mounted for movement with the carriage and is preferably biased towards the main feed roller 86 by a spring or other suitable resilient means. As herein shown the shaft of the idler roller 87 is supported in a vertical position on one end of a flat horizontal plate 97 which is mounted below the carriage 88 for horizontal swinging movement on a pivot pin or bolt 98 that is rigidly connected to the carriage. The opposite end of the plate 97 is yieldably connected to the pin 95 at the forward end of the carriage 88 by a tension spring 99 which extends between said pin and a downwardly projecting pin 100 that is carried by the plate 97. Since the pivot pin 98 is located between the pin 100 and the shaft of the rotatable idler roller 87, the plate 97 is biased in a clockwise direction by the spring 99 to press the idler roller rearwardly toward the continuously driven feed roller 86.

In the device shown herein, the shaft of the idler roller is spaced from the side edge of the horizontal carriage 88 and projects upwardly past said plate through an opening in the plate 5 which permits pivotal and longitudinal movement of the shaft. The clockwise movement of the plate 97 is preferably limited so that the idler roller 87 is moved forwardly out of tape feeding position in engagement with the feed roller 86 whenever the plate 88 is moved forwardly away from the magnetic head 7. As shown in Fig. 6, the guide pin 83 nearest the feed roller 86 engages the idler roller 87 to limit clockwise swinging thereof when the plate 88 is moved forwardly by its spring 94. The spring-pressed idler roller moves out of engagement with said pin 83 when it is moved rearwardly by the plate 88 to tape feeding position in engagement with the tape on the roller 86 as shown in Fig. 4.

The plate 97 and its pivot pin 98 support the idler roller 87 accurately with its axis vertical and parallel to the accurately positioned feed roller 86 so that a uniform pressure will be applied to the tape by the feed members 86 and 87 during feeding of the tape. The tension spring 99 is so selected as to provide the desired gripping pressure between the feed rollers, and the idler roller is preferably provided with an elastic rubber sleeve or the like for engaging the tape. The rubber will be deformed by the gripping pressure between the feed rollers so as to prevent slippage of the tape on the rollers.

The magnetic head 7, the guide pins 83, and the feed rollers 86 and 87 are arranged so that the machine may operate with a minimum amount of distortion, wow and flutter. The tape threading and feeding mechanism disclosed herein is of an inexpensive type which would operate effectively with relatively high tape speeds on a high fidelity magnetic recording or playback machine which contained the highest quality and most expensive electronic and electrical apparatus.

A flanged U-shaped support 101 is located below the top plate 5 and is rigidly connected thereto by bolts or the like. Any suitable means may be carried by the support within the case 2 for driving the feed roller 86 and the driving roller 105. As herein shown, a constant speed electric motor 102 is provided in the case 2 below the support 101, and the top of the motor housing is provided with a horizontal rectangular flange 103 which is bolted to or otherwise rigidly connected to the support 101. The motor has an upwardly extending vertical cylindrical shaft 104 coaxial with and integrally connected to the feed roller or capstan 86 which is also in the form of a cylindrical shaft. A synchronous electric motor, a hysteresis motor, or various other constant speed motors would be suitable to drive the shaft 104.

An externally cylindrical, reel-driving roller 105 is mounted above the top plate 5 rearwardly of the feed rollers and the magnetic head for movement with the carriage 88 toward and away from a magazine in the recess 12. This roller has a height above the top plate less than the magnetic head 7 and the top of the notch 53 so that the magazine may slide over the roller into its operating position in the recess 12. An arcuate slot 106 is provided in the top plate 5 to permit horizontal swinging movement of the drive roller 105.

Any suitable means may be provided for operably connecting the motor shaft 104 to the upright driving roller 105 while permitting movement of the roller into and out of engagement with the coil-carrying disc 21 of the tape reel in response to movement of the carriage 88. It will be understood that the means shown herein is intended merely to illustrate the principle of the invention and may be replaced by various other mechanisms which may perform the necessary functions in substantially the same or in a more efficient manner.

As herein shown, the driving means for the roller 105 includes a large pulley 107, a small pulley 108, and a crossed belt 109 of a flexible and elastic material, such as rubber or the like, for converting clockwise rotation of the shaft 104 into counterclockwise rotation of the roller 105 about its vertical axis. The large pulley 107 is coaxial with and rigidly connected to the motor shaft 104 for rotation therewith in unison. The small pulley 108 is coaxial with and rigidly connected to the shaft 118 of the reel driving roll 105 so that the angular speed of the driving roller 105 shown herein is greater than that of the feed roller 86.

Any suitable means may be provided for moving the driving roller into and out of engagement with the tape reel. As herein shown, the shaft 118 is supported by a flat horizontal plate 110 mounted above the support 101 for horizontal swinging movement about a vertical axis. The plate 110 extends laterally and is swingably mounted at one end on a vertical pivot pin 111 which is rigidly connected to the support 101 and projects upwardly therefrom. The end of the plate 110 mounted on the pin 111 may be enlarged or provided with an integral boss as desired to properly support the plate in cantilever fashion in a horizontal position.

The opposite end of the plate 110 is shown herein as being provided with a vertically projecting lug 112 having a small circular opening therein of a size for slidably receiving a longitudinally elongated cylindrical rod 113. The rod has an external diameter slightly less than the internal diameter of said opening and has a head 114 at its rear end of greater diameter than said opening which engages the lug 112 to limit forward movement of the rod toward the control shaft 14. The rod has a radially extending collar 115 forwardly of the lug 112 which engages a helical compression spring 116 that is coaxial with the rod. The compression spring extends between the collar 115 and the lug 112 and functions like the tension spring 99 to bias the driving roller 105 toward the tape reel when the carriage 88 is moved rearwardly away from the control shaft 14. When the carriage is moved forwardly toward the control shaft, the spring 116 causes the rod 113 to move forwardly until the head 114 engages the lug 112.

The plate 97 is shown herein as being provided with a downwardly projecting lug 117 which engages the front end of the rod 113 when the carriage 88 is moved rearwardly away from the control shaft. A bracket or other suitable means may be provided on the top of the support 101 for guiding the front portion of the rod 113 toward the lug 117 and for preventing vertical and lateral movement of said front portion out of the path of movement of said lug.

When the control shaft 14 is rotated in a counterclockwise direction to the "play" position indicated in Fig. 1, the carriage 88 and the plate 97 carried thereby are moved rearwardly away from the control shaft and toward a magazine in operating position in the recess 12. As the plate 97 moves rearwardly, the idler roller 87 moves into engagement with the tape and the lug 117 pushes the rod 113 rearwardly to compress the spring 116, to press the plate 110 in a counterclockwise direction, and to move the driving roller 105 through the notch 53 into engagement with the coil-carrying disc of the tape reel mounted in the magazine. When the control shaft 14 is rotated in the opposite direction to the "off" position indicated in Fig. 1, the plate 97 and its lug 117 are moved forwardly and the plate 110 is free to swing in a clockwise direction. The compression spring 116 has sufficient strength to cause a slight stretching of the elastic belt 109 as the driving roller 105 is pressed against the tape reel. The tension in the belt serves to swing the plate 110 clockwise and pull the roller out of contact with the tape reel as the carriage 88 moves forwardly toward the control shaft 14. It will be noted that the electric motor 102 may be turned on by one of the control knobs 3 and 4 before the control knob 15 is moved to "play" position and that the rollers 86 and 105 may be continuously driven by the motor. Therefore, the driving roller 105 must be moved out of driving engagement with the tape reel to stop rotation of said reel if the electric motor is not stopped. The elastic belt 109 serves this purpose.

Since the notch 53 is preferably located halfway between the opposite sides of the magazine, the reel driving roller 105 is usually located substantially midway between the longitudinal portions of the guide 10 so as to move into said notch when the control knob 15 is moved to "play" position.

As pointed out in the aforesaid continuation-in-part application Serial No. 459,313, the friction between the convolutions of the tape coil in the tape reel is minimized when the angular velocity of the innermost convolution of the coil is slightly greater than that of the rotating portions of the reel engaging said convolution. The diameter of the reel-engaging portion of the driving roller 105 may be selected to provide proper angular velocity of the coil-carrying disc 21 of the tape reel with respect to the average linear velocity of the tape. for example, with a coil-supporting disc of a given diameter, the diameter of the roller 105 with respect to the diameter of the roller 86 may be such that at least one of the convolutions of the endless tape coil and less than about half of the tape have an angular velocity slightly greater than that of the disc. With such an arrangement the friction would be reduced sufficiently so that a coil of the tape having a rather large number of convolutions would operate satisfactorily.

It will be noted, however, that the angular velocity of the rotatable coil supporting disc engaging the driving roller 105 will vary in accordance with changes in its diameter unless the peripheral speed of the roller 105 is varied. Various means may be provided for varying the peripheral speed of the coil supporting disc 21 or the driving roller 105 with respect to that of the feed roller 86, so that a disc of any given diameter and the portion thereof engaging the innermost convolution of the tape coil can be rotated at a predetermined angular speed to reduce the friction between the convolutions of the coil. As herein shown, the portion of the shaft 118 projecting above the top surface 6 is adapted to receive a small or large diameter detachable cylindrical sleeve 119 or 120. Each sleeve may slide vertically off the top end of the shaft but is driven by the shaft when mounted thereon and cannot rotate with respect to the shaft. The sleeves are preferably made of flexible and elastic rubber or other rubber-like material so as to avoid slipping between the shaft and the sleeve thereon or between said sleeve and the coil-carrying disc. Each sleeve is also of a size to fit in the notch 53 of its associated magazine as the driving roller is swung about its pivotal axis.

The small rubber sleeve 119 is shown in Fig. 4 in driving or gripping engagement with the disc 21 of the small reel 20. If the large magazine A′ and the large tape reel 20′ are to be employed, the small sleeve 119 is removed and replaced with the larger sleeve 120 as shown in Fig. 14, the larger sleeve being shown in that figure in driving engagement with the coil-carrying disc 21 of the large reel while the guide pins 83 and the idler 87 are in their rearmost positions.

The magazine A or A′ may be designed so that the rubber sleeve of the driving roll 105 is movable through the notch 53 into driving engagement with the coil-carrying disc of the tape reel 20 or 20′. It will be apparent that the diameter of the rubber sleeve mounted on the shaft 118 may be varied in accordance with the diameter of the coil-carrying disc which it drives and the diameter of the frusto-conical hub of the disc so as to drive the disc at the desired angular velocity with respect to that of the innermost coil convolution regardless of the size of the tape reel.

It is often desirable to provide means for limiting the rearward movement of the driving roller 105 toward the tape reel so that a magazine may be moved to its operating position in the recess 12 and the tape therein may be advanced over the magnetic head 7 without the tape reel engaging the driving roller. Such limiting means might be employed with magazines having small diameter reels and a relatively short length of tape since such tape may be fed satisfactorily without driving the tape reel.

As herein shown, the rearward movement of the shaft 118 is limited by the rear edge of the slot 106 so that said shaft cannot move far enough to engage the disc 21 of the reel 20 or 20′ when the rubber sleeve 119 or 120 is removed. Driving of the reel 20 or 20′ therefore cannot occur unless the sleeve is on the shaft 118. The small magazine A and its reel 20 will operate excellently with the sleeve 118 removed so long as the endless tape 17 has a relatively short length of tape (for example, less than about 150 feet). However with larger magazines containing several hundred feet it is preferable to drive the reel positively by means of the roller 105. By driving the reel at the most desirable angular speed, it is feasible to employ endless tapes having lengths as great as about 1200 feet.

If the large sleeve 120 of the driving roller, for example, is permanently attached to the shaft 118 and is designed to drive the large reel 20′ at the proper speed, the magazines for the smaller reels may be designed so that these reels cannot engage the sleeve 120 but will be driven solely by the friction of the tape. In such a case, the slot 106 would prevent movement of the sleeve 120 rearwardly against the smaller tape reels. If the large magazine A′ were employed carrying perhaps 300 to 600 feet of endless tape, the reel 20′ would be driven by the sleeve 120 of the driving roll 105; but if the small magazine A were employed carrying perhaps less than 150 feet of tape, the reel 20 would not be driven by the roll 105.

It will be noted that upon rotation of the control shaft 14 the tape from the magazine is automatically threaded between the feed rollers, the parts are automatically moved to their tape feeding positions, and/or the magazine is automatically ejected from the recess 12. It is manifest that the automatic threading, feeding and ejection features of the present invention could be employed to great advantage in various automatic machines (juke boxes, for example, or various machines for automatically loading a plurality of different magazines in succession). However, as shown in the drawings the apparatus is semi-automatic rather than fully automatic, the loading of the magazine into the machine is manual rather than automatic, and the shaft 14 is controlled manually rather than by an automatic electrical control.

It will be noted that the tape threading and feeding apparatus illustrated herein is compact and employs an economical construction so that it may be used on small portable tape recorders or reproducers and that it also is of a type which may be used to practical advantage on expensive high fidelity machines employing higher tape feeding speeds. Magazines of the type shown herein and the tape guides therein may be mass produced at nominal cost by plastic molding. The tape reels may also be made of inexpensive plastic and formed by simple molding operations. The permanent metal parts of the threading and feeding apparatus are more expensive than the plastic parts within the removable magazine, but most of these parts may be made at relatively low cost by bending flat metal strips and by simple machining operations. The feed roller 86 and the guide pins 83 may be precision parts made of the most desirable metals available without adding appreciably to the cost of the mechanism. The idler roller 87 may also be of the highest quality without unduly adding to the cost of the apparatus since there is no duplication of expensive parts due to locating the idler within the replaceable magazine. The machine may have the accuracy and the tape speed needed for a high fidelity machine even though the tape guiding members 41 in the magazine are merely molded from plastic and do not position the tape with any great accuracy. Due to the improved construction of the present invention, it is possible to build at reasonable cost a machine which will operate efficiently with a given length of tape for over 500 hours whether operated continuously or intermittently and which will operate with less than about 0.3 percent flutter and wow.

Since the present invention eliminates the need for a play spindle, a feed spindle, complicated drive pulleys and belts, rewind mechanisms and other parts normally used in the higher quality magnetic sound recording and playback machines employing two tape reels rather than an endless tape, machines incorporating the tape threading and feeding apparatus of the present invention can be manufactured at low cost with respect to units of conventional design and comparable performance characteristics.

The electrical apparatus employed in the case 2 may vary considerably and may be relatively simple in an inexpensive unit or may be complicated in an expensive high fidelity machine. For example, the electric motor 102 may be of a type which operates at several different predetermined speeds in which case suitable switches or the like would be provided for selecting the desired constant speed. The speed of the motor is usually selected to provide a tape speed of from about 1⅞ to 15 inches per second.

In the more complicated machines provision might be made to stop the playing of the tape automatically after a predetermined time or in response to movement of the tape to a predetermined location. For example, if a given control frequency is recorded at a predetermined point on the tape, the feeding of the tape may be automatically stopped in response to the control frequency signal when that portion of the tape reaches the magnetic head or some other fixed point. This facilitates stopping of the endless tape at the desired location. It will be apparent that an easily loaded tape recording and reproducing machine has very many useful applications where sounds of a given frequency are recorded on the tape to serve as automatic controls for causing various movements in a given sequence or in synchronism with a sound record.

The operation of the magnetic tape recording and reproducing device 1 should be apparent from the above description. The control knob 15 is normally in the "off" position as shown in solid lines in Fig. 1. While the control knob is so positioned, the cam surface 80 of the lever 44 and the cam roller 79 are in engagement and the rear portion of the lever 44 is in its raised position as shown in solid lines in Fig. 3 and in dotted lines in Fig. 5. At this time the latches 55 are in their uppermost positions as shown in dotted lines in Fig. 7, the cam roller 93 is out of contact with the cam surface 91 as shown in Fig. 2, the guide pins 83 and the rollers 87 and 105 are in their forward positions nearest the shaft 14 as shown in Figs. 2 and 6, the ejector rods 63 are in their rearmost positions as shown in Fig. 6, and the detent 69 is in its locking position as shown in Fig. 6 with the stop 70 thereof in the path of movement of the radial lug 68.

Unless and until a magazine is moved to its operating position in the recess 12 or until the detent is swung in a clockwise direction, the control knob 15 may not be rotated in a counterclockwise direction towards the "play" position. However, the detent 69 does not prevent clockwise rotation of the control knob. Upon rotation of the knob 15 perhaps about ten to twenty degrees in a clockwise direction from the "off" to the "eject" position shown in dotted lines in Fig. 1, the cam roller 160 engages the cam 59 to move the rear portions 57 of the latches to their lowermost or released positions below the top surface 6 as shown in Figs. 7 and 8.

The main control knob may be moved manually or automatically by a spring or other suitable means back to the "off" position before a magazine is inserted in the recess 12. The compression springs 61 return the latches to their locking position after counterclockwise rotation of the main control knob to or beyond the "off" position.

Figure 2:
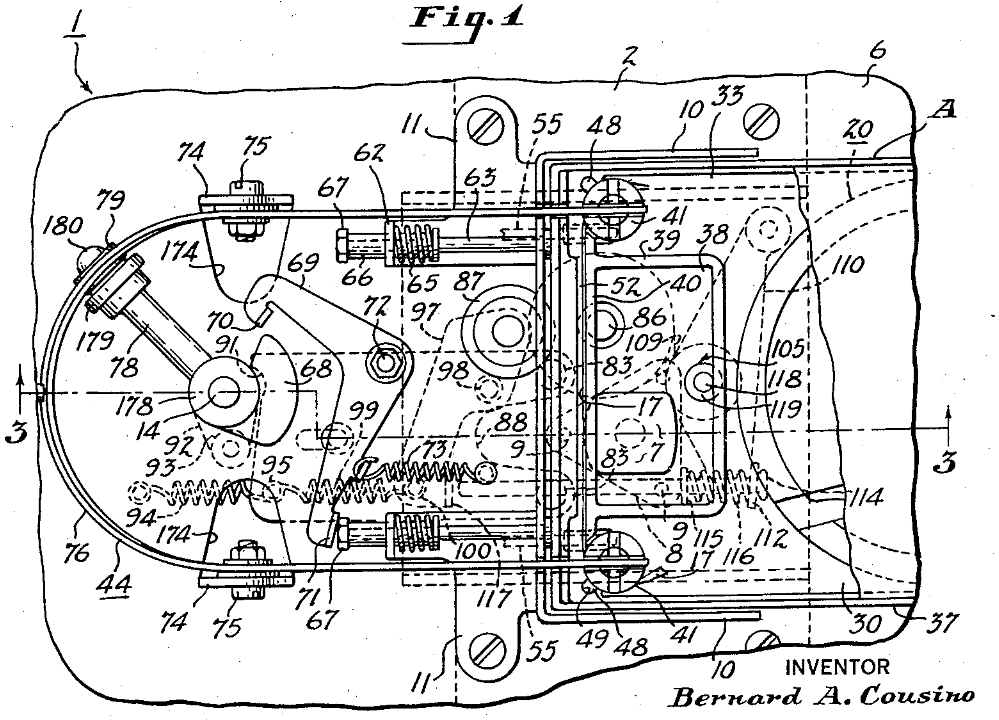
Figure 2 is a fragmentary top view similar to Fig. 1 and on a larger scale with the cover removed and the cover portion of the magazine broken away.

Upon insertion of the forward portion of a large or small magazine into the recess 12, the parts assume the positions shown in Figs. 2 and 3. At this time, the heads 163 of the ejector rods are held by the flat vertical wall forming the front of the magazine substantially in engagement with the guide 10, the ejector rods 63 are held in their forward positions so as to hold the detent 69 out of the path of movement of the lug 68, the tape guides 41 are in their uppermost positions as shown in Figs. 3, 10 and 12 so that the bottom edge of the straight portion of the tape between said guides is above the tape of the members 7, 83, 86, 87 and 105, the latches 55 engage the forward edges of the slots 156 as shown in dotted lines in Fig. 10 to hold the magazine in its operating position and to resist movement of the magazine by the ejector rods, and the members 87 and 105 are in their forward positions out of contact with the tape or the tape reel.

With the magazine in its operating position in the recess 12, the control knob may be rotated in a counterclockwise direction for a predetermined angular distance (which may, for example, be about ninety degrees as herein shown or any other suitable amount) from the "off" to the "play" position as shown in dotted lines in Fig. 1. If desired the cam surface 80 may be designed to limit the counterclockwise movement of the arm 78 or other suitable means may be provided to prevent counterclockwise rotation of the shaft 14 and the control knob 15 beyond the "play" position.

Normally the control knobs 3 and 4 or any switches that may be provided for this purpose are adjusted to start rotation of the electric motor 102 and to energize the electronic equipment while the main control knob 15 is in its "off" position, but if desired the electric equipment may be deenergized at the time the main control knob is moved to "play" position in which case the feed rollers would be moved into positions to feed the tape and would thereafter initiate tape feeding upon energization of the motor. Such a method of operation might be employed, for example, before the knobs 3 and 4 are adjusted to obtain the desired volume and/or tone. However, after the electrical apparatus is properly adjusted by the knobs 3 and 4 to obtain the desired volume, speed, etc. it is usually preferable to allow the electric motor 102 to rotate continuously while different magazines are successively inserted into the recess 12 until the use of the machine is discontinued for a noticeable period of time.

During movement of the control knob towards the "play" position, the following events take place in sequence: (*a*) the cam roller 79 moves along the cam surface 80 at the front of the lever 44 and forces the semicircular portion 76 upwardly to the position shown in solid lines Fig. 5, whereby the guides 41 are lowered a predetermined amount (for example, to the position shown in dotted lines in Fig. 12) and the portion of the tape 17 between the guides is lowered between the feed rollers 86 and 87 and between the guide pins 83 and the magnetic head 7 and into a position in horizontal alinement with the grooves 84; (*b*) thereafter the cam roller 93 moving along the cam surface 91 to force the carriage 88 rearwardly toward the magazine moves the guide pins 83 against the tape and causes the tape to engage and to conform to the smoothly curved front face 82 of the magnetic head 7; and (*c*) after the tape is positioned fairly accurately in the grooves 84 and against the face 82 of the magnetic head and during the final portion of the counterclockwise movement of the control shaft 14, the feed roller 87 and the driving roller 105 are pressed rearwardly by the springs 99 and 116, respectively, into their tape feeding positions.

The feed rollers preferably attain sufficient gripping engagement with the tape to start the tape feed at the same time as or just before the driving roller 105 rotates the coil-carrying disc 21 and at least an instant after the tape is positioned against the head 7. In the device shown herein the roller 105 initiates rotation of the tape reel 20 or 20′ as substantially the same time as the rollers 86 and 87 initiate feeding of the tape 17.

It will be understood that the tape supported between the guides 41 is located substantially in alinement with or forwardly of the front surface of the magnetic head 7 and the continuously driven roller 86 and rearwardly of the idler roller 87 and the guide pins 83 before the tape is lowered so that the tape does not become entangled during lowering of said guides and does not otherwise interfere with the lowering of the guides.

At any time the control knob 15 may be rotated in a clockwise direction from the "play" to the "off" position to terminate driving of the tape and the tape reel by the normally continuously driven rollers 86 and 105, respectively. Upon rotation of the knob in that direction the cam roller 93 moves away from the cartridge A or A′ and the spring 94 contracts to move the carriage 88 forwardly toward the shaft 14. The pivot pin 98 moves with the carriage and one of the guide pins 83 engages the idler roller 87 to move said roller out of gripping engagement with the tape as or just before the guide pins move out of engagement with the tape. As the carriage 88 moves forwardly the rod 113 is pressed forwardly by expansion of the spring 116 and the driving roller 105 is pulled out of gripping engagement with the coil supporting disc 21 by the contraction of the elastic belt 109 and releases said disc at substantially the same time as the idler roller 87 releases the tape. The tape reel 20 or 20' therefore stops rotating at the same time as the feeding of the tape is discontinued by the feed members 86 and 87. Upon further clockwise movement of the shaft 14 to the "off" position, the spring 81 contracts to tilt the lever 44 and the springs 42 expand to raise the tape vertically into the slot 52. The magazine may then be removed by turning the control knob 15 to the "eject" position to release the latches 55 and to permit moving of the magazine rearwardly by the rods 63.

Figures 15 to 20 show a modified form of the present invention wherein tape reels and removable endless tape magazines may be employed on the same tape recorder. Figure 15 shows a portable tape recording and reproducing mechanism 1*a* having conventional electronic equipment housed within a rectangular box or case 2*a*. The electrical equipment is turned on and off by a single control knob 15*a* which regulates the volume and/or other variables, such as speed, tone or the like, through a vertical control shaft 14*a*. The knob 15*a* may also control suitable switches so that a message may be recorded when the knob is turned in one direction from a predetermined position and a recorded message may be played back when the knob is turned in the opposite direction.

The tape recorder 1*a* has a flat metal top plate 200 at the upper end of the case 2*a* and a cover plate 201 which substantially covers said top plate. The entire upper surface of the cover plate is flat except for a raised portion 202 which projects upwardly to form a rectangular housing of substantially uniform height throughout its width and length. Projecting above the flat top surface of the plate 201 are a motor-driven capstan or feed roller 86*a*, a pair of laterally alined locating pins or studs 203 for positioning a removable tape magazine adjacent the housing 202, a magnetic transducer head 7*a* between said pins, a pair of laterally alined vertical studs 204 for positioning a pair of conventional tape reels 205, a U-shaped magazine guide 206, and a pair of laterally alined tape guides 207 for positioning the magnetic tape from the reels 205 adjacent the face of the magnetic head 7*a* and the surface of the capstan 86*a*. A rubber-covered idler roller 87*a* is provided for moving the tape into or out of engagement with the capstan 86*a* to initiate or stop the tape feed; and, if desired, guide pins similar to the pins 83 of the tape recorder 1 may also be provided to insure proper positioning of the tape against the head 7*a*, or a reel-driving roller similar to the roller 105 may be provided to drive the endless tape reel in the tape magazine. The locating pins 203, the U-shaped guide 206, and the tape guides 207 are placed so as to locate a removable tamper-proof magazine similar to the magazine A in a predetermined operating position adjacent the housing portion 202 as shown in dot-dash lines in Fig. 15.

Means are provided within the housing portion 202 for lowering the tape in the tamper-proof magazine to a playing position between the feed rollers 86*a* and 87*a* and adjacent the magnetic head 7*a*. Such means may be similar to the U-shaped tape-depressing lever 44 and the actuating mechanism therefor within the cover 13 but preferably comprises tape-depressing levers or fingers which may be retracted into the housing 202 when the magazine is removed. As herein shown, the housing 202 contains a pair of parallel tape-depressing levers or fingers 208 which may be advanced above the tape or retracted within the housing as shown in dot-dash lines in Fig. 17 in response to rotation of the knob 15*a* in either direction. A somewhat similar tape-depressing mechanism which may be employed in the housing 202 is shown in Figs. 24 to 27 as will hereinafter be described.

The fingers 208 are formed from a single symmetrical piece of sheet metal and are integrally joined by an upwardly arched transverse portion 209 so that the fingers move in unison. The fingers are mounted on a symmetrical, one-piece, U-shaped, sheet metal, supporting member 210 having upright side walls 211 and 212 and an upright end wall 213 rigidly connected to the top plate 200 by attaching screws 214. The side walls 211 and 212 of the supporting member 210 are pivotally connected to the fingers 208 by a pair of laterally alined pivot pins or bolts 215 that are rigidly connected to said member by nuts 216, and said side walls are provided along their upper edges with a pair of laterally alined, inturned lugs or stops 217 that are engageable with the top edges of the fingers 208 to limit the upward swinging movement thereof. The parallel fingers 208 are provided with laterally alined, horizontally elongated slots 218 with a width for slidably receiving the pivot pins 215. The pivot pins and slots mount the fingers for longitudinal sliding movements and for vertical swinging movements about the horizontal axis of said pivot pins.

The rear portions of the fingers 208 behind the pivot pins are biased downwardly toward the top plate 200 by a pair of helical tension springs 219 that are connected between lugs 220 on the rear of the fingers and notches or slots 221 in the bottom portion of the rear wall 213. The springs yieldably resist vertical tilting of the fingers about the pivots 215, press the fingers upwardly against the lugs 217, and press the portions of the fingers forming the front of the slots 218 rearwardly against the pins 215 as indicated in dot-dash lines in Fig. 17.

An actuating means is provided to advance the fingers above the tape and to cause lowering of the tape in response to rotation of the control shaft 14*a*. As herein shown, the control shaft is provided with an upper end portion 222 of semi-circular cross section which projects above the housing 202 and is detachably received by a similarly shaped recess in the control knob 15*a*, and the shaft is positioned relative to the plate 200 for rotation about a vertical axis by a bearing member 223. A symmetrical horizontal actuating bar 224 is rigidly connected at its center to the shaft 14*a* between the bearing 223 and the top of the housing 202 by means of a cylindrical pin 225 which extends through and has a press fit in said actuating bar and said shaft. Rigidly connected to the actuating bar 224 near its opposite ends are a pair of identical downwardly projecting vertical pins or shafts 226 which are screwed into the bar. These pins rotatably support a pair of vertical cam rollers 227 which are mounted on the pins to rotate about vertical axes located the same distance from the vertical axis of the control shaft 14*a* and which are adapted to engage the arched portion 209 to move the fingers longitudinally.

The central part of the portion 209 is transversely arcuate and is arched to provide an arcuate cam surface 228 on the rear edge thereof and a smoothly curved convex cam surface 229 on its top face, the cam surfaces of the portion 209 on opposite sides of the cam surfaces 228 and 229 being relatively straight and flat as best shown in Figs. 16 and 19. The arched cam surface 228 preferably has a radius of curvature equal to the distance between the axis of the control shaft 14*a* and the cam-engaging surface of the cam roller 227 as shown in Fig. 16 so that the fingers 208 are not moved longitudinally as the roller 227 moves along the surface 228. As herein shown, a shallow arcuate notch 230 is provided in the portion 209 midway between the fingers 208 to receive one of the rollers 227 and to retain said rollers and the actuating bar 224 in a longitudinal position parallel to said fingers as shown in dot-dash lines in Fig. 16 when the knob 15*a* is released and the tape is in playing position as shown in Fig. 18.

The opposite end portions of the actuating bar 224 are turned downwardly to provide a pair of identical cam lugs 231 for engaging the top cam surface 229. The cam lugs are spaced from the top plate 200 a distance greater than that from said plate to the opposite ends of the transverse portion 209 so that the fingers 208 are elevated when the actuating bar 224 is in a position as shown in solid lines in Figs. 16 and 17. However, one of the lugs 231 engages the cam surface 229 and gradually lowers the portion 209 and the tape-depressing portions of the fingers 208 to the position shown in Fig. 18 as the bar 224 is rotated from the position shown in solid lines in Fig. 16 to the longitudinal position shown in dot-dash lines in that figure. When the actuating bar 224 is rotated in either direction from said longitudinal position, the lugs 231 are moved out of engagement with the cam surface 229 to permit raising of the portion 209 by the springs 219. When the actuating bar is in a predetermined neutral transverse position perpendicular to the fingers 208 as shown in dot-dash lines in Fig. 16, the fingers are fully retracted as shown in dot-dash lines in Fig. 17.

It will be apparent from the drawings how one of the cam rollers 227 engages the edge of the member 209 when the actuating bar is rotated in either direction from said predetermined neutral position and how the fingers are moved forwardly by such cam roller as the control knob 15*a* is further rotated in the same direction. Of course, the cam surface 228 and the notch 230 may be shaped to accommodate the tilting of the member 209 relative to the roller 227 as the roller moves along such surface during lowering of the tape.

The mechanism for lowering the tape shown in Figs. 15 to 19 is particularly advantageous in a tape recording and play-back machine wherein a message is recorded on the tape when the control knob is turned in one direction and a message on the tape is reproduced when said control knob is turned in the opposite direction. Since the actuating bar 224 and the transverse portion 209 are both symmetrical with respect to a plane through the axis of the control shaft 14*a*, the same sequence of events (namely, advancing the fingers, lowering the tape, raising the tape, and retracting the fingers) may be obtained by rotating the control knob 15*a* through 180 degrees in either direction from a predetermined neutral or "off" position, and the fingers 208 will have the same position when the knob is rotated a given amount from said neutral position regardless of the direction of turning. By rotating the control knob 15*a* in either direction from an "off" position, the lowering of the tape and other functions necessary for proper operation may be effected. Such functions may be controlled by rotating the knob 15*a* in one direction during recording and by rotating the knob in the opposite direction during reproducing of a message.

Figures 24 to 27 show a modified form of tape-depressing mechanism suitable for the machine 1*a*. The finger-actuating mechanism illustrated in these figures is unsymmetrical and does not permit 360 degree rotation of the control knob as in the first-described device shown in Figs. 15 to 19, but such mechanism functions much like said device and has advantages not found in said device. The mechanism includes a vertical control shaft 14*b* which may be rotated by a suitable control knob (not shown) and a symmetrical, one-piece, U-shaped, sheet metal lever 44*a* which may be tilted vertically like the lever 44 of Figs. 1 to 8 to raise and lower the magnetic tape in the removable magazine in response to rotation of said control shaft. The lever 44*a* has a transverse portion 232 and a pair of parallel longitudinal side portions or fingers 233 integrally connected to opposite ends of said transverse portions for depressing the tape. A substantially horizontal plate 234 is rigidly connected to the rear portion of the lever 44*a* between the fingers 233.

The lever 44*a* is mounted for longitudinal sliding movements and vertical swinging movements on a pair of rigid, parallel, laterally alined, upright, sheet metal supports 235 having inturned horizontal flanges 236 near their opposite ends that are rigidly connected to the flat top plate 5*a* of the recording and reproducing device 1*b* and having a pair of inturned vertical flanges 237 extending substantially the full height of the supporting members 235. The flanges 237 have a pair of narrow vertical slots 238 with a width slightly greater than the width of the fingers 233 to guide the fingers as they move vertically and longitudinally. The supports 235 are provided with two laterally alined pairs of longitudinally elongated slots 239 and 240 of uniform width, and the tape-depressing fingers 233 are provided with two laterally alined pairs of cylindrical rollers 241 and 242 with a diameter substantially equal to the width of said slots which roll substantially the full length of the slots as the fingers are advanced and retracted. The cam rollers 241 and 242 are mounted for rotation on the fingers 233 about a longitudinally spaced pair of horizontal axes and ride on the edges of the slots 239 and 240 to support the fingers. The slots 239 are horizontal and prevent vertical movement of the rollers 241, but the slots 240 are downwardly inclined at their forward ends to cause lowering of the rollers 242 as the fingers 233 are advanced. As the rollers approach the front ends of the slots, the tape-depressing fingers approach the position shown in dot-dash lines in Fig. 25 and in solid lines in Fig. 26 wherein the tape is depressed and is exposed for contact with the magnetic head and the tape feeding rollers of the tape recorder 1*b*. The front portions of the fingers 233 are reduced in height and are shaped like the front portions of the lever 44 of Figs. 1 to 8 to provide a flat bottom surface 144*a* for engaging the vertically movable, tape supporting guides of the removable magazines, said surface 144*a* being horizontal as shown in dot-dash lines in Fig. 25 when said guides are fully depressed. The rear portions of the slots 240 are horizontal so that the fingers may be advanced to a position above the tape guides of the magazine before the surfaces 144*a* are lowered into engagement with the tape guides to lower the tape.

The means for actuating the fingers 233 is somewhat similar to the mechanism shown in Figs. 15 to 19 for actuating the fingers 208, but no springs are necessary for retracting the fingers. Such means includes a rigid metal actuating member 244*a* that is operably connected to the control shaft 14*b* for rotation about the axis of said shaft. The actuating member is rigidly connected to an annular hub 243 that is mounted for vertical sliding movement on the shaft 14*b* between a pair of horizontal stop pins 244 and 245 which extend through the shaft and project from opposite sides thereof. The hub has a pair of diametrically opposed V-shaped notches 246 for receiving the stop pin 245 and is biased downwardly toward said pin by a helical compression spring 247, an annular metal washer being interposed between the upper pin 244 and the spring 247 to limit upward movement of the spring. The spring has sufficient strength to cause rotation of the actuating member 244*a* and advancing or retracting of the fingers 233 when the control shaft 14*b* and the pin 245 are rotated but permits rotation of the pin 245 with respect to the hub 243 whenever the actuating member reaches the limit of its movement in either direction.

A pair of substantially vertical cylindrical pins 249 and 250 are rigidly connected to the opposite ends of the actuating member 224*a* to provide non-rotatable shafts for a pair of cylindrical cam rollers 251 and 252 as best shown in Fig. 27. As herein shown, the cam roller 251 is mounted for rotation about an axis that is tilted with respect to the vertical at an angle corresponding substantially to the extent of angular tilting of the U-shaped lever 44*a* so that the axis of the roller 251 is perpendicular to the plate when the tape is depressed as indicated in dot-dash lines in Fig. 25. The cam roller 252 is also tilted but only about half as much since the roller 252 moves out of engagement with the slot 254 before the fingers 233 are fully depressed.

The cam rollers 251 and 252 engage the plate 234 to slide the lever 44*a* forwardly and rearwardly in response to rotation of the control shaft 14*b*. The plate 234 may be shaped in any suitable manner to obtain the desired movement of the tape-depressing fingers 233. The plate may, for example, be designed to permit 360 degree rotation of the actuating member 224*a* in either direction or to complete a cycle of operation when the control shaft is rotated in either direction as in the tape-depressing mechanism of Figs. 15 to 19. However, as herein shown, the rotation of the actuating member 224*a* is limited, and movement of the fingers longitudinally in one direction can be effected only by rotating the control shaft 14*b* in the proper direction. The plate 234 is provided with a pair of cam slots 253 and 254 for receiving the cylindrical rollers 251 and 252, respectively. The slot 254 is straight and perpendicular to the fingers 233 but has a tapered edge 255 providing an enlarged mouth for receiving the roller 252, the width of the slot beyond the edge 255 being uniform and substantially equal to the diameter of the roller 252. The locking slot 253 is arcuate and substantially concentric to the control shaft 14*b* throughout the major portion of its length so that the lever 44*a* does not move longitudinally when the roller 251 is located in that part of the slot. However, the slot 253 is inclined toward the shaft 14*b* at its forward end or mouth so that the cam roller 251 moves the lever 44*a* a short distance longitudinally. The slot 253 has a width throughout its length substantially equal to the diameter of the roller 251 and is positioned with respect to the slot 254 so that the roller 251 enters the slot 253 before the roller 252 leaves the slot 254 and so that the roller 252 enters the slot 254 before the roller 251 leaves the slot 253 when the control shaft 14*b* is rotated in the opposite direction.

The position of the actuating member 224*a* when the tape-depressing fingers are elevated and fully retracted is shown in Fig. 24. As the actuating member is rotated counterclockwise from that position, the cam roller 252 engages the forward marginal edge of the cam slot 254 to advance the fingers 233 above the tape guides of the removable magazine and to lower the fingers as the cam roller 251 enters its slot 253. By the time the roller 251 reaches the arcuate portion of the slot 253, the fingers are in their lowermost positions as shown in dot-dash lines in Fig. 25. Further counterclockwise rotation of the actuating member 224*a* to the position shown in Fig. 26 does not move the lever 44*a* further. The slot 253 limits the extent of counterclockwise rotation of the actuating member so that the pin 245 of the control shaft will move out of the notches 246 if further rotation in that direction is attempted. By rotating the control shaft 14*b* in the clockwise direction the lever 44*a* may readily be retracted to its original position as shown in Fig. 24.

Since the arcuate portion of the cam slot 253 permits a substantial amount of rotation of the control shaft 14*a* after the tape is depressed to its lowermost position, means may be provided for moving the feed rollers into driving engagement with the tape and for moving the tape to a predetermined operating position against the smoothly curved face of the magnetic transducer head in response to such rotation of the control shaft. The magnetic tape recording and playback device 1*b* may be provided, for example, with cam operated means similar to the elements 88 to 100 of the tape recorder 1 for moving the feed rollers into driving engagement with the tape and for pressing the tape against the magnetic head in response to rotation of the control shaft 14*b* after the tape is lowered and after the cam roller 251 reaches the arcuate portion of the cam slot 253. With such a construction the threading and feeding of the tape can be effected automatically in response to rotation of the control shaft 14*b*.

Figures 16 to 23 show a modified form of removable tamper-proof magazine $A^2$ according to the present invention, said magazine being constructed substantially like the magazine A of Figs. 1 to 12 and functioning in a similar manner. The magazine of cartridge $A^2$ is constructed to fit on the locating pins 203 of the tape recording and reproducing mechanism 1*a* and may be employed on the mechanism 1*a* or 1*b* with the tape-depressing fingers 208 or 233. Figures 15 and 24 to 26 show the cartridge in dot-dash lines in its operating position while Figs. 16 to 23 show the details of its construction. Like the reel-carrying cartridge A and the endless tape reel 20 therein, the cartridge or magazine $A^2$ and its reel may be made entirely of an inexpensive plastic material.

As herein shown, the magazine or cartridge $A^2$ has a substantially rectangular front portion 256 and a semi-circular rear portion 257. The front lower portion of the magazine is provided with a substantially rectangular recess 38*a* of a size to fit over the magazine guide 206 and over the magnetic head 7*a* and the rotating capstan 86*a*, said recess being positioned midway between the sides of the magazine to provide the magazine with front corner portions 258 and 259 of the same size. The magazine has a flat plastic horizontal bottom wall 260 and a continuous vertical wall 39*a* integral with the bottom wall and forming the margin of the recess 38*a*. Centrally located in the rear portion of the bottom wall 260 is an annular reel-positioning stud 32*a* integral with the bottom wall and projecting upwardly therefrom.

A one-piece plastic cover 261 is mounted on the magazine $A^2$ and is detachably connected thereto by means of an attaching screw 51*a* which is screwed into the stud 32*a* as best shown in Fig. 22. The cover has a continuous marginal wall 262 that overlies the marginal portions of the bottom wall 260. The marginal wall has a semi-cylindrical vertical end wall portion 35*a* concentric to the stud 32*a* and parallel vertical side wall portions 36*a* and 37*a* which define a chamber 30*a* in the magazine of a size to receive a reel of magnetic tape and has a substantially straight transverse front wall portion 40*a* perpendicular to the side wall portions 36*a* and 37*a* and extending above the recess 38*a*. Integral with the marginal wall 262 is a substantially flat horizontal top wall 50*a* which completely covers the recess 38*a* and the tape-receiving chambers between the wall 39*a* and the marginal wall 262.

As herein shown, the top and marginal walls of the plastic cover 261 are reinforced by two pairs of straight vertical ribs 263 and 264, which are integrally connected at their inner ends to a cylindrical rib 270 concentric to the stud 32*a* and are radially alined with the stud 32*a* of the bottom wall. The ribs 263 extend toward the rear wall 35*a* and have vertical posts 265 integral with said wall. The ribs 264 extend toward the wall 39*a* and are integrally connected at their outer ends to a pair of vertical posts 266 which are spaced from said wall. A vertical transverse rib 267 parallel to the rear portion of the wall 39*a* is integrally connected to the posts 266 as best shown in Fig. 21. The radial ribs 263 and 264, the transverse rib 267, and the circular rib 270 are integral with the top wall 50*a* and terminate in a plane parallel to said top wall as shown in Fig. 22 so as to limit movement of the tape in the magazine toward said top wall. The posts 265 and 266 are located the same distance from the axis of the stud 32*a* and extend below the bottom edges of the ribs 263 and 264, terminating in a plane parallel to said top wall. If desired, one or more vertical reinforcing posts or ribs 268 may be provided of substantially the same size as said posts and terminating in said plane.

Any suitable endless tape reel may be mounted in the chamber 30*a* for rotation on the stud 32*a*. As herein shown, a reel 20*a* is located in the magazine $A^2$, said reel having a spirally-wound flat roll or coil 29*a* of magnetic sound tape 17*a* mounted thereon for rotation about the axis of said stud 32*a*. An annular bearing member 23*a* of nylon or other suitable plastic material is mounted on the stud 32*a* between the top and bottom walls of the magazine for rotatably supporting the reel 20*a*. The reel is shown herein as being formed of two pieces of plastic which are rigidly connected for rotation in unison. The reel comprises a flat horizontal circular disc or plate 271 and a coaxial frusto-conical hub 272 similar to the coil-supporting plate 21 and the hub 22 of the reel 20. The coil-supporting plate 271 is annular in form and has a cylindrical inner portion 269 mounted for rotation on the bearing member 23*a* and a cylindrical outer circumferential edge 273 conentric to said cylindrical portion. The internal diameter of the portion 269 is substantially equal to, but slightly greater than the external diameter of the vertical reel-engaging surface of the bearing member 23*a* so that the reel may rotate with a minimum amount of friction, and the external diameter of said cylindrical portion is substantially equal to the internal diameter of the hub 272 mounted thereon so that the hub may be rigidly connected to the disc 271 by glueing or the like. The diameter of the surface 273 is preferably only slightly less than the internal diameter of the rear wall portion 35*a* of the cover 261 so that said surface extends below the bottom surfaces of the poses 265, 266 and 268. As herein shown, said bottom surfaces are located just above the peripheral edge 273 and the top marginal surface of the coil-supporting disc 271 so that the posts prevent movement of the outermost convolution of the coil 29*a* radially outwardly of said peripheral edge, the bottom edges of the ribs 263 and 264 being located a very short distance above the flat top of the coil 29*a* (a distance substantially less than the width of the tape) so as to prevent vertical movement of the tape out of the coil between the innermost and outermost convolutions thereof. The posts and ribs of the cover 261 prevent the coil of tape from coming off the reel 20*a* during operation of the tape, when the magazine $A^2$ is removed from the tape recorder and is tilted or inverted, at other times.

The frusto-conical outer surface of the axially-tapered hub 272 is concentric to the portion 269 of the disc 271 and engages the innermost cylindrical convolution of the coil 29*a* to position the coil concentric to the stud 32*a* and to guide the tape from the coil. As herein shown, said frusto-conical surface terminates substantially at the top of the coil since the annular hub 272 is shown with a height equal to the width of the tape 17*a*. The tape is guided from the innermost cylindrical convolution of the tape coil to the front corner portion 258 of the magazine, across the recess 38*a* past the magnetic head 7*a* to the front corner portion 259, and back to the outermost cylindrical convolution of the coil as best shown in Fig. 21. As shown in that figure, the tape 17*a* is in the form of a Mobius loop and twists 180 degrees as it passes from the corner portion 259 to the outermost convolution of the coil. The Mobius loop permits long playing as previously explained and may be used in any of the removable magazines disclosed herein, if desired.

A vertically projecting guide member 274 may be provided for engaging the tape 17*a* as it passes from the innermost convolution to the front portion 258. Such guide member, as shown in Figs. 21 and 23, is located transversely of the tape and has a tape slot 275 at its upper end with a width substantially equal to the width of the tape 17*a*. The bottom of the slot which engages the tape is preferably straight, is preferably inclined at an angle of about 30 to 45 degrees with respect to the horizontal so as to guide the tape from its substantially horizontal position as it passes over the coil to its vertical position at the front of the magazine, and is preferably located above the plane of the top surface of the coil so as to support the portion of the tape between the guide member 274 and the innermost convolution of the coil and to reduce frictional contact thereof with the top of the coil. The guide member 274 is molded integral with the bottom wall 260 and extends upwardly therefrom substantially as high as the wall 39*a* so as to engage the bottom face of the top wall 50*a* whereby said top wall prevents movement of the tape out of the slot 275.

Molded integral with the vertical wall 39*a* and the bottom wall 260 of the magazine $A^2$ are a pair of laterally alined vertical posts 276. Said posts are located in the front corner portions 258 and 259 of the magazine at the front ends of the wall 39*a* and extend from the bottom wall 260 to the top wall 50*a* as shown in Figs. 17 and 18. The bottom wall 260 is thickened at the rear of the posts 276 and is provided with a pair of laterally alined circular openings 277. The locating pins 203 fit in said openings as shown in Figs. 16 to 18 to hold the magazine against horizontal movement out of its normal operating position adjacent the housing 202. The upper parts of the posts 276 are integrally joined by a straight transverse connecting portion 278. Said connecting portion is parallel to and spaced from the straight portion 40*a* of the cover 261 so as to provide a straight narrow tape slot 52*a* in the front portion of the magazine above the recess 38*a*. The slot 52*a* functions like the slot 52 of the magazine A to receive a straight portion of the tape and to completely cover that portion of the tape. The slot is relatively narrow so that the magazine $A^2$ is substantially tamper proof and the tape is protected against careless handling.

Suitable means is provided at the front of the magazine $A^2$ to cause relative movement between a portion of the tape 17*a* and a portion of the magazine to expose a portion of the tape in the recess 38*a* so that it may engage the magnetic head 7*a* while the magazine is in its normal operating position. As herein shown, the parallel portions of the walls 36*a*, 37*a* and 39*a* form rectangular tape-receiving channels on opposite sides of the recess 38, and the tape 17*a* is mounted on a pair of tape guides 41*a* for movement upwardly and downwardly in said channels substantially from the bottom wall 260 to the cover 50*a* of the magazine.

The guides 41*a* may be mounted on the magazine $A^2$ in any suitable manner for movement substantially vertically. As herein shown, the posts 276 are provided with a pair of laterally alined, internally cylindrical, vertical, guide bores 279 for slidably receiving the tape guides 41*a*. Each of said tape guides 41*a* has externally cylindrical side and rear portions with a diameter substantially equal to the diameter of the bores 279 which fit in and slidably engage the bore and has a forwardly projecting front portion 280 which extends through a narrow vertical guide slot in the front of a post 276 having a width only slightly greater than the width of the portion 280. Said slot extends the full height of its associated bore 279 to permit vertical movement of the tape guide 41*a* between an upper position against the top wall 50*a* as shown in Fig. 17 and a lower position against the bottom wall 260 as shown in Fig. 18. The bottom portions of the tape guides 41*a* within the vertical bores 279 are recessed to receive helical compression springs 42*a* which engage the bottom wall 260 and bias said guides toward their upper positions. The top surfaces of said tape guides which engage the top wall 50*a* are shown as being flat for engagement with the fingers 208. A pair of narrow longitudinal slots 45*a* with a width slightly greater than that of the sheet metal fingers 208 are provided at each side of the magazine cover 261 in alinement with the bore 279 to permit vertical movements of the fingers 208 through the front portion of the magazine, and similar slots 54*a* of substantially the same width are provided in the housing portion 202 for a similar purpose. The portions of the magazine cover 261 forming the margins of the slots 45*a* are shown herein as being turned outwardly to form vertical ribs 281 at the front of the magazine for engaging the housing 202 when the magazine is in its normal operating position.

The narrow forwardly projecting portions 280 of the tape guides 41a are enlarged at their forward ends to provide tape-retaining projections 282 and have smooth flat upper surfaces extending from said projections to the posts 276 for slidably engaging the bottom edge of the tape 17a to support the tape with a minimum amount of friction. Means are provided for holding the side faces of the tape upright in the front portion of the magazine. As shown herein, the tape-engaging portions of the tape guides 41a are narrow and are unable to perform this function, the posts 276 serving as stationary tape guides to hold the side faces of the tape 17a in an upright position. The front and side surfaces of the posts 276 which engage the tape are smoothly curved to minimize friction and are vertical so as to hold the tape in a vertical position. As herein shown, said posts are provided with a pair of integral laterally alined vertical ribs or protuberances 283 that extend the full height of the posts for engagement with the tape. The vertical tape-engaging surfaces of the posts 272 forwardly of said ribs are cylindrical and concentric to the bores 279. The ribs 283 have vertical cylindrical tape-engaging surfaces of smaller diameter that are slightly closer to the sides of the magazine than the tape-engaging surfaces of the posts 276. The cylindrical tape-engaging surfaces of the posts 276 and the ribs 283 engage the face of the tape when the tape is elevated in the tape slot 52a above the recess 38a and when the tape is in its lowermost exposed position in the recess to hold the side faces of the tape substantially vertical. When the tape is stretched between the posts and the tape guides 41a are in their uppermost positions as shown in Figs. 16 and 17, the straight portion of the tape between said posts is substantially in the middle of the tape slot 52a and is completely enclosed by said slot above the recess 38a. Said straight portion is also a short distance forwardly of the tape-engaging portion of the capstan 86a and the magnetic head 7a so that it may be readily lowered between the feed rollers 86a and 87a and moved into engagement with the capstan and the magnetic head. Said capstan and said head preferably have top surfaces below the bottom surfaces of the transverse portions of the magazine forming the sides of the tape slot 52a to facilitate positioning of the magazine in its operating position or removal of the magazine.

The tape guides or supports 41a and the posts 276 function much like the tape guides 41 of the magazine A to move the tape 17a from a retracted position wherein the tape is completely enclosed by the magazine to an advanced position wherein a substantial length of the tape is exposed in the recess 38a for engagement with the magnetic head and the feed rollers. The magazine $A^2$ is quite similar to the magazines A and A′ and is of a type which may be used on the same tape recorders as the latter magazines. It will be understood, for example, that a magazine constructed substantially like the magazine $A^2$ may be used on the tape recording and reproducing device 1 of Figs. 1 to 8 and that a magazine constructed substantially like the magazine A or A′ may be used on the tape recording and reproducing device 1a or 1b.

The magazine $A^2$ may be provided with a notch 53a similar to the notch 53 to permit driving of the coil-supporting disc 271 of the reel 20a by a driving roller similar to the reel-driving roller 105. If desired, the tape recorder 1a may be provided with such a reel-driving roller, but such roller is not needed for ordinary lengths of tape. If such a roller is provided, the U-shaped guide 206 may be omitted, in which case the pins 203 would provide sufficient means to position the magazine.

The magazine $A^2$ may be lowered to an operating position on the flat horizontal upper surface of the cover plate 29 by placing the openings 277 of the magazine in alinement with the locating pins 203 and lowering the magazine over said pins. Such alinement is facilitated when the U-shaped guide 206 is present since said guide engages the wall 39a to position the magazine properly as best shown in Fig. 16. The tape-depressing fingers 208 do not interfere with lowering of the magazine to its operating position and removal of the magazine from said position since such fingers may be retracted as shown in dot-dash lines in Fig. 17 so as to be out of the path of movement of the magazine. After the magazine is placed in its normal operating position, the control knob 15a may be rotated ninety degrees in either direction from its neutral or "off" position as shown in Fig. 15 until one of the cam rollers 227 enters the notch 230. Such rotation advances the fingers 208 above the tape guides 41a and lowers the fingers in the slots 45a and 54a to the position shown in Fig. 18, the lower surfaces of the fingers engaging the tops of the guides 41a and lowering them in unison into engagement with the bottom wall 260 of the magazine. The fingers extend over the tape and cause the tape to slide on the front vertical surfaces of the guide posts 276 from its uppermost position in the slot 52a to its lowermost position as shown in Fig. 18. After the magnetic tape is lowered, the feed rollers 86a and 87a are moved into tape feeding position in engagement with the opposite side faces of the tape and the tape engages the face of the magnetic head 7a for the recording and reproducing of a message on the tape. Thereafter the tape feeding rollers are moved to a released position out of engagement with the tape and the control knob 15a is rotated to return the actuating bar 224 to its neutral position as shown in Fig. 15 so as to retract the fingers 208 through the slots 54a out of the way of the magazine. The magazine may then be removed by lifting it off the pins 203 and replaced with another magazine.

When a magazine is placed in its operating position on the locating pins 203 and it is desired to record a message on the tape, the control knob 15a is rotated ninety degrees in one direction from its neutral position to lower the tape and to condition the machine for recording. If it is desired to play back a recorded message rather than to record a message, the tape is lowered by rotating the control knob 15a ninety degrees in the opposite direction so as to condition the magnetic head and the electronic equipment for reproducing.

It will be apparent to those skilled in the art that a magazine constructed according to the present invention and suitable for use with the recording and reproducing mechanisms 1, 1a and 1b may take various forms in addition to those described above and that the tape reel mounted for rotation in the magazine may be quite different from the reels described herein. Figures 28 to 31 show a modified form of magazine or cartridge $A^3$ adapted to fit on the tape recorders 1a and 1b and of a type suitable for use on a tape recorder similar to the recorder 1 and various other tape recorders. The magazine $A^3$ is shaped substantially like the magazine A and $A^2$ and has a substantially rectangular front portion 285 and a rounded rear portion 286 in which may be mounted an endless tape reel (for example, a reel similar to the reels 20 and 20a or of the type disclosed in my copending application Serial No. 459,313, filed September 30, 1954). The magazine has a flat bottom wall 287 extending the full length of the magazine and an annular vertical stud 32b integral with said bottom wall and extending upwardly therefrom. Mounted on the stud 32b above the bottom wall 287 is a one-piece cover 288 having a flat top wall 50b and an integral continuous marginal wall 289 that extends along and engages the margins of the bottom wall. The marginal wall includes a semi-cylindrical rear wall portion 35b concentric to the vertical stud 32b, parallel longitudinal vertical side wall portions 36b and 37b, and a transverse vertical front wall portion 40b perpendicular to said side wall portions. The lower forward portion of the magazine is provided with a substantially rectangular recess 38b with a vertical marginal wall 39b integral with the bottom wall 287 and forming the front marginal edge of said bottom wall. A flat horizontal plate 290 is molded integral with the wall 39b near the top end thereof and is located above the recess 38b. Said plate is parallel to the top wall 50b of the cover 288 and is spaced a short distance therefrom to provide a straight transverse slot 52b above the recess 38b and communicating therewith for receiving the tape 17b as shown in Fig. 29.

The cover 288 has an annular thickened portion 291 recessed to receive the upper portion of the stud 32b and is positioned in engagement with the wall 39b and the stud with its top plate 50b parallel to the bottom wall 287 and its marginal wall 289 in engagement with the marginal portions of said bottom wall. The stud 32b is internally threaded to receive an attaching screw 51b coaxial with the stud and the cover portion 291 which screw detachably connects the cover to the stud. Like the magazine A², the cover and the portions of the magazine A³ integral with the bottom wall may be economically molded of a suitable plastic material.

The marginal walls 39b and 289 provide a large chamber 30b in the rear portion 286 of the magazine for receiving an annular tape reel 20b with a flat roll or coil 29b of endless magnetic tape 17b mounted thereon for rotation about a vertical axis. The parallel portions of the vertical walls 36, 37b and 39b define rectangular tape-receiving channels 292 and 293 at the front corner portions of the magazine, and a loop of tape extends forwardly from the innermost cylindrical convolution of the coil 29b through the channel 293 to one front corner portion of the magazine, laterally across the recess 38b to the other front corner portion of the magazine, and rearwardly through the channel 292 to the outermost cylindrical convolution of the coil. As herein shown, the portion of the tape moving rearwardly in the channel 292 toward the coil 29b is untwisted and has vertical side faces, but it will be understood that the tape will twist 180 degrees during movement from the front of the magazine to the outermost convolution of the coil 29b where a Mobius loop is employed. Like the walls 39 and 39a of the magazine A and A², the wall 39b is spaced from the front wall portion of the magazine to permit movement of the tape laterally between the front corner portions of the magazine, vertically elongated openings 284 being provided between the wall portions 39b and 40b to receive the tape and to permit vertical movement thereof into and out of the recess 38b.

The portion of the tape extending through the openings 284 between the front channels 292 and 293 is supported by a pair of independent, alined, vertically movable, tape guides 41b of similar shape and is adapted to be moved by the guides between a lowermost position wherein it is exposed in the recess 38b as shown in Figs. 30 and 31 and an uppermost position wherein it is in the slot 52b and completely enclosed by the magazine as shown in Figs. 28 and 29. The tape guides 41b are mounted for vertical swinging movements about a horizontal axis on a pair of laterally alined pivot pins or screws 294 which are received in laterally alined, internally threaded openings in the wall 39b near the front ends thereof. Each tape guide is biased towards its uppermost position shown in Fig. 29 by a coiled tension spring 42b, said spring having one end connected to the tape guide and its opposite end connected to the wall 39b so as to yieldably resist rotation of the guide from said uppermost to said lowermost position. Each guide 41b is formed with a smooth guide slot 295 at its forward end for receiving and guiding the tape 17b, said slot having a width substantially equal to that of the tape so as to engage the opposite edges of the tape as it moves in the slots and having a smoothly curved surface for engaging the face of the tape along its full width. Said smoothly curved surface of the slot 295 is vertical when the tape guide is in its lowermost position as shown in Fig. 31 so as to hold the side faces of the tape vertical and is nearly horizontal when the tape guide is in its uppermost position as shown in Fig. 29 so as to support the tape horizontally in the transverse slot 52b above the recess 38b. The front corners of the tape guides 41b nearest the side walls 36 and 37b are provided with smooth retaining lips 296 to prevent movement of the tape out of the slots 295 accidentally, the retaining lips of each slot extending from the top and bottom of the slot towards each other to provide the slot with a narrow mouth having a width preferably not substantially greater than about half the width of the tape as shown in Fig. 31. The slots 295 are spaced from the pivots 294 a distance corresponding substantially to that between said pivots and the lower portion of the slot 52b so that a substantially straight portion of the tape 17b stretched between the guides 41b may be rotated about the pivots 294 from the recess 38b into the transverse slot 52b. The front edges of the tape guides 41b are closer to the pivots 294 than the top wall 50b and the front wall 40b so that the guides are free to rotate between their uppermost and lowermost positions as indicated above.

The tape guides 41b may be swung vertically about their pivots 294 in unison to lower the tape after the magazine A³ is moved to its operating position on a tape recording or playback device or at an earlier time. Said guides may lower the tape in response to rotation of a control knob or in response to movement of the magazine to said operating position. As herein shown, the guides 41b are actuated in unison by a pair of identical, laterally alined, vertical, cylindrical pins 203a. The bottom wall 287 is provided with a pair of laterally alined, circular openings 297 with a diameter substantially equal to that of said pins for slidably receiving the pins when the magazine is in its normal operating position, and the rear portions of the tape guides 41b are shaped to provide smoothly curved cam surfaces 298 for engaging the tops of the pins 203a to cause vertical swinging of the guides. When the cam surface 298 is positioned relative to the actuating pin 203a as shown in Fig. 31, the tape is fully depressed; and, when said surface is out of contact with the pin, the tape is out of the recess 38b and completely enclosed by the magazine as shown in Fig. 29.

Figures 30 and 31 show a portion of a tape recording and reproducing device 1c having a flat horizontal top plate 5b similar to the plate 5 of the tape recorder 1 for supporting a tape magazine. The device 1c has a magnetic transducer head 7b, a motor-driven capstan or feed roller 86b, and a freely-rotatable rubber-covered idler roller 87b projecting vertically a short distance above the plate 5b for engagement with the tape of the magazine A³ when it is in its lowermost position as shown in Fig. 31. Said elements may be the same as the elements 7, 86 and 87, respectively, of the tape recorder 1 and may function in the same manner. If desired a reel-driving roller 105b, corresponding to the roller 105 of the tape recorder 1, may be provided for drivingly engaging the reel in the chamber 30b in which case a notch 53b may be provided in the bottom wall 287 and the vertical wall 39b to permit movement of the roller 105b into and out of engagement with the reel; but such a driving roller is unnecessary and is usually omitted for ordinary lengths of tape.

Like the magazines A, A' and A², the front lower portion of the magazine A³ is open forwardly of the rectangular recess that receives the magnetic head so as to permit movement of the feed rollers into a tape-feeding position in engagement with the opposite side faces of the tape, a rectangular opening 299 being provided in the front wall portion 40b for this purpose. Such opening may have a width just sufficient to permit movement of the idler roller 87b against the capstan 86b if the magazine is dropped vertically to its operating position but preferably has a length corresponding to that of the recess 38*b* and a height slightly greater than that of the magnetic head 7*b* and the capstan 86*b* so as not to interfere with horizontal movement of the magazine into or out of its operating position.

The tape guides 41*b* are tilted when the cam surfaces 298 thereof engage the pins 203*a* in response to relative vertical movement between said pins and the bottom wall 287 of the magazine. Such relative movement may be obtained by moving the pins 203*a* upwardly through the openings 297 from a position below the top surface of the plate 5*b* by means of a rotatable control knob or other movable control member after the magazine $A^3$ is in its normal operating position shown in Figs. 30 and 31, or by mounting the pins 203*a* in a stationary position on the plate 5*b* and dropping the magazine $A^3$ over the pins in which case the pins 203*a* would serve the same purpose as the locating pins 203 to prevent horizontal movement of the magazine on the plate 5*b* out of its normal operating position and the magazine would have to be moved vertically to said operating position.

The magnetic pick-up head 7*b* and the capstan 86*b* do not interfere with vertical swinging of the straight portion of the tape stretched laterally between the slots 295 of the tape guides and are positioned so as to be adjacent the rear vertical face of the tape when the tape is in its lowermost position in the recess 38*b*. The curved surfaces of the slots 295 engaging the rear side face of the tape are vertical and substantially in lateral alinement with the front vertical surfaces of the capstan and the magnetic head when the tape is lowered as shown in Fig. 30 so that the tape may easily be lowered between the feed rollers 86*b* and 87*b* substantially to a playing position in engagement with the magnetic head. After the tape is lowered the feed rollers may be moved to a tape-feeding position in engagement with the opposite vertical faces of the tape and the tape may be pressed against the magnetic head for recording or reproducing.

Figures 28 to 32 show one form of endless tape reel 20*b* according to the present invention which functions effectively when operated upside down, said reel being shown for convenience in the magazine $A^3$ although it obviously may be mounted in the magazine A or $A^2$ or in various other magazines or may be mounted on a stud not associated with a magazine. The reel 20*b* is particularly advantageous for use on a sound tape recording and/or reproducing device for an airplane or other vehicle when the reel is sometimes tilted or turned upside down during operation.

Like the tape reels 20 and 20*a* previously described, the reel 20*b* has a round tape-engaging axially-tapered hub and a coil-supporting plate at the smaller diameter end of the hub that is rotatable with said hub so that the reel 20*b* functions like the previously described reels when it is in its normal operating position with its axis vertical. However, unlike the previously described reels, the reel 20*b* has a second plate at the larger diameter end of the hub that is rotatable with said hub and that supports the coil when it is inverted. When the reel is operated in an inverted position with its axis vertical, it functions much like the reels 20 and 20*a* except that the tape from the innermost convolution of the coil is withdrawn at the larger diameter end of the tapered hub and passes under the coil as it moves to the front corner portion of the magazine. In such a case there may be substantial friction between the tape leaving the innermost convolution and the bottom of the tape coil.

To reduce such friction it is often preferable to coat both faces of the endless magnetic-coated tape on the reel 20*b* with a thin continuous film of colloidal graphite, for example by the method disclosed in my copending abandoned applications, Serial Nos. 342,684, filed March 16, 1953 and 459,313.

The tape produced by such method is coated throughout its width and length with iron oxide or other suitable magnetic material and the magnetic coating is covered throughout its width and length with a thin uniform and continuous film of colloidal graphite particles which adhere strongly to the tape, said film having the shingle-like formation characteristic of flaked material deposited from dispersion in liquid. Both side faces of the tape may have such a shingle-like graphite film and both may have a magnetic oxide coating.

It is often advantageous to employ double-oxide-coated magnetic tape in the reel 20*b* to increase the length of the message recorded on the tape or to reduce the length of tape needed to receive a given set of messages. The double-oxide-coated tape permits effective use of the Mobius loop, for example, which doubles the playing time of a given length of tape. The decrease in length of tape made possible by the Mobius loop and the magnetic coatings on both sides of the tape substantially reduces the frictional drag.

Figures 33 and 34 show the tape 17*b* on an enlarged scale. Such tape comprises a flexible base or ribbon 312 of cellulose acetate, "Mylar" (polyethylene terephthalate oriented by stretching in two substantially perpendicular directions and having a molecular weight sufficiently high to show a characteristic crystal X-ray diffraction pattern when stretched in such manner), or other suitable plastic non-magnetic material. The ribbon 312 has a uniform width and thickness throughout its length and is coated on both sides in the conventional manner with finely divided particles of iron oxide in a suitable binder to form thin layers 313 on both side faces of the tape which extend the full width and length of each of said side faces.

The magnetic oxide coatings 313 are completely covered by thin uniform and continuous films 314 of minutely divided or colloidal graphite which adhere to the tape. Each of the films 314 reduces the coefficient of friction of the tape 17*b* and renders such tape electrically conductive along its length so as to prevent the buildup of static charges between convolutions of the tape which could cause attraction between the adjacent convolutions and binding of the tape.

A nylon bearing member similar to the bearing members 23 and 23*a* of the reels 20 and 20*a*,, respectively, may be mounted on the stud 32*b* to provide an anti-friction support for the reel 21*b*, or a ball bearing may be mounted between the stud and the reel for this purpose. As herein shown, the stud 32*b* has a smooth outer bearing surface that engages the reel 20*b* to mount the same concentric to the stud for rotation about an axis perpendicular to the bottom wall 287.

The reel 20*b* is shown herein with a molded plastic frusto-conical hub 300 that increases in diameter toward the top wall 50*b* and a flat molded plastic circular disc or plate 301 rigidly connected to said hub and having a cylindrical upwardly projecting inner portion 302 coaxial with said hub. The plate 301 has a smooth flat-tape-engaging surface 303 which is located in a plane perpendicular to the axis of the hub 300, and the portion 302 has a smooth internally cylindrical bearing surface which engages the bearing surface of the stud 32*b* to position the surface 303 parallel to the bottom wall 287. The axial length of the inner cylindrical portion 302 may be slightly less than the distance between the flat reel-supporting surface of the stud 32*b* and the flat bottom surface of the plastic cover portion 291 to provide a small clearance between the stationary portions of the magazine and the rotating reel while preventing substantial axial movement of the reel in either direction. The cylindrical bearing surface of the stud 32*b* engaging the inner cylindrical surface of the disc 301 has an axial length greater than said clearance so that the reel is held against tilting in a position coaxial with the stud 32*b* even when the reel is upside down. When the reel is inverted the flat end surface of the cover portion 291 engages the axially outer end of the portion 302 and provides an anti-friction bearing surface on which the reel may rotate.

Rigidly connected to the upper or large diameter end of the hub 300 is a flat annular molded plastic plate or disc 304 shown herein as being of circular shape and having the same diameter as the first-mentioned plate 301. The second plate 304 has a smooth flat tape-engaging surface 305 located in a plane parallel to the surface 303 of the first plate 301 and spaced from said surface by a distance greater than the width of the tape **17*b* and the axial height of the coil 29*b* supported on the reel between said surfaces. The hub 300 has a smooth exterior frusto-conical surface 306 which engages the innermost cylindrical convolution of the coil 29*b* and extends substantially from the surface 303 to the surface 305. The distance between the flat tape-engaging surfaces 303 and 305 of the reel 20*b* is substantially less than twice the width of the tape to prevent tangling of the tape and must be sufficient to permit easy movement of the tape between the coil 29*b* and the disc surface 305**. Said distance may be greater than the width of the tape or the axial height of the coil by a very small amount (for example about five to ten times the thickness of the tape) depending on the width and thickness of the tape employed and usually by an amount less than about one-tenth of an inch so that the coil does not move axially a substantial distance on the reel when the reel is inverted.

The top plate 304 may be blued or otherwise rigidly attached to the reel after the coil **29*b* is mounted on the hub 300. If desired, an opening may be provided in the plate 304 or a detachable connection may be provided between the hub and the plate to permit access to the coil but such access is usually unnecessary after the coil 29*b*** is once mounted properly on the hub.

As herein shown, the tape from the innermost convolution of the coil **29*b* passes between the top of the coil and the surface 305 to the tape guide 41*b* at the front of the magazine without engaging any auxiliary stationary guides, but it will be apparent that a stationary guide similar to the guide 274** or any other suitable guide may be provided if desired.

The upper and lower edges of the endless tape **17*b* are shown herein as being of the same length and are spaced apart the same distance throughout the length of the tape so that the major portion of the tape may be wound with its side faces vertical to form a flat coil 29*b* having contacting cylindrical convolutions. Special tapes which form frusto-conical coil convolutions may also be mounted on the reel 20*b* but they are more expensive to manufacture, are harder to handle, and require special tape magazines to accommodate the tape loop. Ordinary tape such as the tape 17*b*** is preferred and permits movement of the tape in a horizontal plane from the magnetic head to the outermost convolution of the coil.

The hub of the reel **20*b* is preferably frusto-conical as shown herein, but it will be understood that various other hub means may also be employed which hold the coil 29*b* concentric to the discs 301 and 304** and permit rotation of the reel by frictional engagement with the tape, for example as disclosed in said copending application Serial No. 459,313. The hub means should hold the inner convolutions of the endless tape coil in frictional engagement and in position coaxial with the reel and should cause sufficient friction between the coil and the reel to rotate the reel at an angular velocity at least substantially equal to that of the outermost coil convolution whether the reel is upright or turned upside down.

The rotating capstan or driving roll **86*b* and the spring-pressed idler roll 87*b* may be moved into engagement with the tape 17*b* to apply a tension to the tape to pull it from the reel 20*b*. The capstan 86*b*** rotates about a fixed vertical axis and is driven at a predetermined constant speed by an electric motor or other suitable driving means.

The tension applied to the tape by the feed rolls pulls the tape from the innermost convolution of the coil across the face of the magnetic head **7*b* at a substantially constant speed. Where the endless tape does not have excessive width or length, the feed roller 105*b* is unnecessary and excellent results may be obtained relying on the friction between the tape and the reel to rotate the coil-supporting plate of the reel. With a small coil of tape on the reel 20*b*** (for example, a one-quarter inch wide tape having a length less than 200 feet or so) there is little variation in the tension on the tape due to friction between convolutions and the tape feed will be relatively uniform with a minimum amount of "wow" or distortion.

With ordinary size tapes the reel **20*b* operates efficiently in upright position or upside down position without any drive roller 105*b*. The feed rollers pull the tape at a predetermined constant linear speed preferably between about 1⅞ and 15 inches per second so that the innermost convolutions of the tape have an angular velocity greater than that of the hub 300 and the plates 301 and 304, the sliding friction between said hub and the tape and between the coil and one of said plates causing rotation of the reel at an angular velocity greater than that of the outermost coil convolution. When the reel is upright as shown in Fig. 29, the friction between the tape convolutions and the reel rotates the reel and the rotating surface 303 engages the bottom edges of the coil convolutions to reduce friction between said convolutions. When the reel is upside down, the friction rotates the reel in a similar manner and the rotating surface 305 engages the edges of the coil convolutions to reduce the friction between the convolutions, but the weight of the coil presses down on the tape passing from the innermost convolution between the coil and the surface 305. The friction produced by contact of the coil 29*b* and the surface 305** with the tape leaving the coil reduces the efficiency of the reel somewhat when the reel is operated upside down but does not prevent the use of substantial tape lengths in the reel even when so operated.

Where larger tape reels are used it is sometimes preferable to provide separate driving means for rotating the reel so as to minimize the friction between convolutions of the coil and to prevent variation in the torque required by the feed roll driving motor to maintain a uniform tape speed past the magnetic head **7*b*. Where the length of the endless tape 17*b* is more than around 300 feet and particularly where said length is 600 feet or more, the reel-driving roller 105*b* may be employed to reduce the friction between the contacting convolutions of the coil 29*b*. The reel-driving roller 105*b* is synchronized with or operably connected to the driving roller 86*b* so that a small and substantially uniform tension is maintained on the tape as it leaves the innermost convolution of the coil 29*b*. Said reel-driving roller may be moved into engagement with the circumferential edge of the disc 301 as shown in dot-dash lines in Figs. 28 and 29 when the idler roller 87*b* is moved against the capstan 86*b***.

In order to minimize friction between convolutions of the tape coil as the tape moves in the coil from the outermost convolution to the innermost convolution, the speed of the capstan **86*b* with respect to the reel-driving roller 105*b* is preselected so that at least one and preferably several convolutions of the tape coil have an angular velocity slightly greater than that of the rigidly connected plates 301 and 304. Preferably less than half of the coil convolutions have an angular velocity greater than that of said plates. Best results are usually obtained where the peripheral speed of the plate 301 is maintained constant by engagement with the roller 105*b* and the capstan 86*b* has a peripheral speed from about 1 to 10 percent greater than the average peripheral speed of the portion of the plate below the innermost convolution of the tape coil so that the angular speed of the innermost convolution is from about 1 to 10 percent greater than that the of plates 301 and 304**.

With the longer tapes, by controlling the angular speed of the reel **20*b*** so that there is no more than about ten percent or so differential speed, the "wows" are substantially eliminated. Coating of the tape uniformly with colloidal graphite also reduces the "wow" and distortion due to variation in the linear speed of the tape at the magnetic head.

Figure 32 shows how the reel **20*b* and the endless tape 17*b* mounted thereon may be stored or shipped when the reel is not in use. According to the present invention a continuous expansible plastic clip or clamping member 307 is provided for mounting on the circumferential edges of the discs 301 and 304 to hold the coil 29*b* on the reel 20*b* and to prevent movement of the outer convolutions of the coil off the reel when the reel is not in use and is removed from the magazine. Such an expansible member may have a plurality of inwardly projecting portions spaced along its periphery which extend radially inwardly between the marginal portions of the discs 301 and 304** to limit radial outward movement of the outermost convolution of the tape and may have portions extending between the marginal portions of the disc to prevent movement of the tape radially outwardly beyond said marginal portions.

As herein shown, the expansible clip 307 is in the form of a continuous plastic strip of substantially uniform radial thickness and axial height which is molded so as to be of substantially cylindrical shape between its opposite ends. The clip is provided at its periphery with a pair of grooves 308 and 309 for receiving the marginal portions of the discs 301 and 304, respectively, and may be provided with peripherally spaced portions or the like which project radially inwardly between the discs to limit the radial movement of the tape. As herein shown, the expansible clip 307 has peripherally spaced inwardly projecting tongues 310 and 311 at its opposite ends which project inwardly between the discs 301 and 304 to limit outward movement of the tape and to assist the peripheral grooves 308 in holding the expansible clip on said discs. The tongues may be relatively close together or may be spaced apart a substantial distance less than the external diameter of the reel. Said tongues are of such size and shape as to prevent removal of the clip 307 from the reel until the clip is expanded a substantial amount. Figure 32 shows in solid lines how the resilient clip 307 may be expanded as it is being placed on or removed from the reel **20*b* and shown in dot-dash lines the position of the clip when it is mounted on the reel. As shown in Fig. 32, the grooves 308 and 309 have a uniform depth and a uniform width substantially equal to the thickness of the marginal portions of the discs 301 and 304 so as to receive said marginal portions and to engage the circumferential edges of said discs substantially throughout the lengths of the grooves. Said grooves are normally circular and receive the major portion of the periphery of the discs 301 and 304, the portions of the clip 307 between the grooves being shown herein as being imperforate and extending radially inwardly between the flat surfaces 303 and 305 of the discs substantially throughout the circumference of the reel to hold the coil 29*b* in the reel. Before the clip 307 is mounted on the reel 20*b*, the endless tape 17*b* may be wound on the reel to minimize the size of the loop between the innermost and outermost convolutions of the coil 29*b*. The clip may be mounted with its tongues 310 and 311 spaced circumferentially a substantial distance from said loop so that the tape cannot move through the opening between said tongues and out of the reel. The friction between the clip 307 and the reel 20*b* effectively resists accidental rotation of the tongues on the reel toward said loop of tape and the inwardly projecting ends of the tongues effectively resist movement of the tape between the tongues. The one-piece plastic clip is simple, inexpensive and easy to mount on the reels and is very effective in retaining an endless tape in the reel 20*b* even where the tape is short and the coil 29*b* has an external diameter substantially less than that of the reel. Since the distance between the tape-engaging surfaces 303 and 305 of the reel may be only slightly greater than the width of the tape, tangling of the tape in the reel 20*b* during shipping or storing is almost impossible after the clip 307** is mounted on the reel.

It will be understood that, in accordance with the provisions of the patent statutes, variations and modifications of the devices herein disclosed may be made without departing from the spirit of the invention.

Having described my invention, I claim:

1. Tape feeding apparatus comprising a detachable magazine, a coil of tape rotatably mounted in the rear portion of said magazine, means for guiding and supporting the tape including a guide member mounted for movement upwardly and downwardly in the front portion of said magazine, means for holding said magazine in a fixed position including yieldable means biasing the magazine in one direction and a releasable latch engageable with the magazine to prevent movement of the magazine in said one direction, a control member, means responsive to movement of said control member and movable into and out of engagement with said guide member for raising and lowering the tape, and means responsive to movement of said control member for moving said latch out of engagement with said magazine when said guide member and the tape supported thereby are in their upper positions to permit ejection of said magazine by said yieldable means.

2. Tape feeding mechanism comprising a magazine, a coil of tape in said magazine, a pair of feed members mounted for relative movement toward and away from each other into and out of tape feeding position, means for moving said members into and out of said tape feeding position, means for guiding said magazine to a predetermined position wherein the tape may be positioned between said members, stop means for preventing movement of said feed members to tape feeding position before said magazine is in said predetermined position, and means responsive to movement of said magazine to said predetermined position for rendering said stop means ineffective so as to permit feeding of the tape after the tape is positioned between said feed members.

3. Tape feeding mechanism comprising a support, a magazine mounted on said support, a spirally wound coil of tape mounted in the rear portion of said magazine, a pair of laterally spaced guide members mounted in the front portion of said magazine on opposite sides thereof for vertical swinging movements, said guide members positioning the tape in one of two different vertical positions, a pair of laterally spaced pins projecting upwardly from said support into said magazine for holding said magazine in a predetermined operating position, said pins engaging said guide members to tilt the same in one direction so as to lower the tape, and spring means for biasing said guide members in the opposite direction to elevate the tape when the magazine is removed from said pins.

4. Tape feeding apparatus comprising spaced vertically movable guides for supporting a substantial length of tape therebetween in upper and lower positions wherein said length of tape is substantially straight, an upright magnetic head on one side of said tape having a smoothly curved tape-engaging surface substantially between said guides, means for lowering said guides in unison to move the tape to a position adjacent the curved surface of said head comprising a pair of fingers mounted for movement horizontally into and out of engagement with said guides and for movement vertically to depress said guides, a control member, means responsive to movement of said control member in one direction for moving said fingers horizontally into engagement with said guides while the guides are in said upper positions and responsive to further movement of said control member in said one direction to lower said fingers and said guides, means for raising said fingers and said guides and for moving said fingers out of engagement with said guides when said control member is moved in the opposite direction, and means responsive to further movement of said control member in said opposite direction for moving said fingers into engagement with said guides and for lowering said fingers and said guides, whereby said tape may be lowered by moving said control member in either direction.

5. Tape feeding apparatus comprising a magazine, a coil of tape rotatably mounted in said magazine, a pair of spaced guide members mounted for movement upwardly and downwardly in the front portions of said magazine, said guide members supporting a substantial length of said tape, means for raising and lowering said guide members in unison including a lever having an end portion for engaging one of said guide members, means forming a pivot about which said lever may swing vertically to raise and lower said end portion, said lever being mounted to slide horizontally with respect to said magazine, a control member, and means responsive to movement of said control member in one direction for moving said lever horizontally toward said one of said guide members until said end portion engages the guide member and responsive to further movement of said control member in said one direction to tilt said lever about said pivot so as to lower said end portion and lower the tape.

6. In a tape recording and/or reproducing device, the combination of a magnetic head having an upright tape-engaging surface, a pair of tape feeding members mounted for movement into and out of a tape feeding position, a removable magazine, a spirally wound flat coil of tape mounted in the rear portion of said magazine for rotation about an upright axis, means carried by the front portion of the magazine for guiding a loop of the tape from said coil, said magazine having a predetermined operating position wherein the tape in said loop near the front of said magazine may be positioned between said feed members and adjacent the tape-engaging surface of said head, means for guiding the magazine horizontally toward said operating position and for holding the tape in said loop above one of said feed members as the magazine is guided horizontally toward said position to prevent the tape from interfering with horizontal movement of the magazine, means for positioning the tape and the magazine for lowering the tape between said feed members and for preventing interference of said feed members and said magnetic head with lowering of the tape, and means for moving the tape feeding members into engagement with the tape while the magazine is in said operating position.

7. A magazine comprising a plastic bottom portion and a plastic cover portion which fit together to form an enclosure, an endless tape reel mounted on said bottom portion within said enclosure for rotation about an upright axis, said reel having a plate with coil-supporting upper surface and an upright axially tapered hub rigidly mounted on said plate, a coil of endless tape wound around said hub and engaging the upper surface of said plate, means for directing a loop of the tape generally horizontally from the innermost to the outermost coil convolution including laterally spaced tape guides near the front of the magazine for holding the side faces of the tape in a substantially vertical position while the magazine is in a horizontal operating position and for guiding the tape in said loop directly in a transverse direction from one of said guides to the other, said tape extending forwardly directly from the innermost coil convolutions to one of said guides, laterally from that guide to the other of said guides, and rearwardly directly from the last-named guide to the outermost coil convolution, said cover portion having an upright front wall for enclosing and protecting the laterally extending portion of said tape between said guides, and means for effecting relative movement of a portion of said magazine and a portion of the tape between said guides from a first position wherein portions of the tape are exposed to a second position wherein said last named portions are completely enclosed within the magazine, and means for yieldably resisting movement out of said second position.

8. In a tape recording and/or reproducing device, the combination of a removable magazine having a coil of endless tape mounted in the rear portion thereof, a loop of the tape extending from the innermost to the outermost convolution of said coil, a magnetic head, a pair of tape feeding members mounted for movement toward and away from each other into and out of a tape feeding position, the front portion of said magazine having openings to receive said tape feeding members and said magnetic head so that a portion of the tape in said loop may be lowered to a position between and in engagement with said members and in engagement with said head when the magazine is moved to a normal operating position, means for guiding the magazine horizontally toward said operating position and for holding the tape above one of said feed members as the magazine is guided horizontally toward said operating position so that the latter feed member does not interfere with such horizontal movement of the tape, and means for guiding the tape in said loop along a predetermined path as the tape is moved upwardly and downwardly relative to said one of said feed members to prevent interference of said feed members and said magnetic head with such relative movement of the tape, and means for moving the feed members against the opposite side faces of the tape in said loop while the magazine is in said operating position.

9. In a sound recording and/or reproducing machine having a magnetic head and tape feeding rollers, a magazine comprising a plastic bottom portion and a plastic cover portion which fit together to form an enclosure, an endless tape reel mounted on said bottom portion within said enclosure for rotation about an upright axis, said reel having a plate with coil-supporting upper surface and an upright axially tapered hub rigidly mounted on said plate, a coil of endless tape wound around said hub and engaging the upper surface of said plate, means for directing a loop of the tape generally horizontally from the innermost to the outermost coil convolution including laterally spaced tape guides near the front of the magazine for holding the side faces of the tape in a substantially vertical position while the magazine is in a horizontal operating position and for guiding the tape in said loop directly in a transverse direction from one of said guides to the other, said tape extending forwardly directly from the innermost coil convolution to one of said guides, laterally from that guide to the other of said guides, and rearwardly directly from the last-named guide to the outermost coil convolution, wall means forwardly of the laterally extending portion of the tape between said guides to protect the latter portion of the tape, and means for automatically moving the tape guides and said wall means relatively vertically to a position wherein said laterally extending portion is substantially completely protected from a position wherein a substantial portion of the tape between said guides is exposed for engagement with said feed rollers and said magnetic head.

10. Tape feeding apparatus for a magnetic sound recording and/or reproducing device having a manual control member, a magnetic head for engaging one face of the tape, and a pair of tape feeding members for engaging the opposite side faces of the tape, said tape feeding apparatus comprising: a removable magazine, a reel mounted for rotation in said magazine, a spirally wound coil of magnetic-coated tape mounted on said reel, means in said magazine for guiding the tape from said coil to form a loop near the front of said magazine, means for holding said magazine in a predetermined operating position adjacent said magnetic head wherein a portion of the tape forming said loop may be positioned between said feeding members and against said magnetic head, means responsive to movement of said control member for moving said feeding members into engagement with the tape in said loop while the magazine is in said operating position, a shielding wall at the front of said magazine to protect the tape in said loop during manual handling of said magazine, means responsive to movement of said control member for causing relative upward and downward movement of the tape in said loop and said shielding wall between a first position wherein the tape in said loop is behind and protected by said wall and a second position wherein portions of the tape are exposed below said wall for engagement with said magnetic head and said feeding members.

11. In a sound tape recording and/or reproducing device having a magnetic head and a pair of tape feeding members for engaging the opposite side faces of the tape, the combination of a plastic magazine having mounted in the rear portion thereof a plastic tape reel comprising a plate with an upper generally horizontal coil-supporting surface and an upright axially tapered hub rigidly mounted on said plate and having a generally frusto-conical tape-engaging surface with a vertical axis centrally of said plate, said reel being mounted on the magazine for rotation about said axis and being enclosed by the magazine, a spirally wound coil of endless tape mounted on said plate for rotation therewith and having cylindrical convolutions engaging said upper surface of said plate, the innermost tape convolutions engaging said frusto-conical surface substantially throughout the circumference of said hub, and means for directing the tape from the innermost to the outermost coil convolution including laterally spaced tape guides at the front corner portions of the magazine having positions directly in front of said reel for holding the side faces of the tape substantially in a vertical position and for guiding a length of the tape directly in a transverse direction from one of said guides to the other, said tape extending forwardly directly from the innermost coil convolution to one of said guides, laterally from that guide to the other of said guides, and rearwardly directly from the last-named guide to the outermost coil convolution, said length of tape and the tape in said coil normally being substantially completely enclosed by said magazine so as not to be disturbed by manual handling of the magazine, means for locating said magazine in a predetermined operating position wherein the tape in said magazine may be positioned between said feeding members for feeding past said head, and openings in said magazine to receive said feeding members and said magnetic head while the magazine is in said operating position, said reel being rotated solely through the pull on the tape by said feeding members.

12. In a magnetic sound tape recording and/or reproducing device having a magnetic head for engaging one face of the tape, the combination of a common control member, a pair of tape feeding members for engaging the opposite side faces of the tape, one of said tape feeding members being mounted for movement toward and away from the other tape feeding member into and out of a tape feeding position, a removable magazine separate from said head and said tape feeding members, a reel mounted for rotation in said magazine, a spirally-wound coil of magnetic-coated tape mounted on said reel and enclosed by said magazine, means carried by said magazine for guiding the tape from said coil to form a loop of a predetermined shape near the front of said magazine, means for supporting said magazine in a predetermined operating position wherein the tape in said loop may engage said magnetic head and may be positioned between said tape feeding members, said magazine serving to enclose the tape and having openings to receive said head and said tape feeding members, means responsive to movement of said control member for moving said feeding members into engagement with the tape in said loop while the magazine is in said operating position, means for locking said magazine in said operating position while said feeding members are in engagement with the tape, and means responsive to movement of said control member for moving said locking means to release the magazine when the feeding members are moved out of engagement with the tape whereby the magazine may be removed from said operating position.

13. Apparatus as defined in claim 12 wherein means are provided for causing relative movement between one of said tape feeding members and a portion of the tape in said loop in a direction generally transversely of the tape, said last-named means being actuated by said common control member.

14. In a magnetic sound tape recording and/or reproducing device having a horizontal support and a tape-engaging magnetic head above said support, the combination of a removable magazine slidably mounted on said support for movement relative to said support into an operating position, a coil of endless tape mounted in said magazine for rotation about a substantially vertical axis, guide means carried by said magazine and spaced from said reel for positioning a loop of tape extending from the innermost to the outermost convolution of said coil, a pair of feed members mounted for movement into and out of a tape-feeding position in engagement with the opposite side faces of said tape for moving the tape over said magnetic head at a substantially uniform linear speed and means movable relative to said magazine for causing further relative movement between one of said feed members and a portion of the tape forming said loop between a position wherein said feed members are located adjacent the opposite side faces of the tape and a position wherein said one of said feed members is below said portion of the tape so that the tape may be moved horizontally over said one of said feed members during horizontal sliding movement of said magazine on said support.

15. In a magnetic sound tape recording and/or reproducing device having a magnetic head for engaging one face of the tape, the combination of a common control member, a pair of tape feeding members for engaging the opposite side faces of the tape, one of said tape feeding members being mounted for movement toward and away from the other tape feeding member into and out of a tape feeding position, a removable magazine, at least one of said tape feeding members being a driven roller located outside said magazine, a reel mounted for rotation in said magazine, a spirally-wound coil of magnetic-coated tape mounted on said reel and enclosed by said magazine, means carried by said magazine for guiding the tape from said coil to form a loop of a predetermined shape near the front of said magazine, means for supporting said magazine in a predetermined operating position wherein the tape in said loop may engage said magnetic head and may be positioned between said tape feeding members, said magazine serving to enclose the tape and having a recess at the front of the magazine to receive said head and one of said tape feeding members, means responsive to movement of said control member for moving said feeding members into gripping engagement with the tape in said loop to cause feeding of the tape while the magazine is in said operating position, means for locking said magazine in said operating position while said feeding members are in engagement with the tape, and means responsive to movement of said control member for moving said locking means to release the magazine when the feeding members release the tape whereby the magazine may be removed from said operating position.

16. Tape feeding apparatus for magnetic sound recording and/or reproducing devices having a magnetic head, said tape feeding apparatus comprising: a removable magazine having an operating position, a strip of magnetic tape spirally-wound to form a coil in said magazine, means in said magazine for guiding a loop of tape from said coil, means carried by said magazine including a front shielding wall adjacent said loop for preventing accidental touching of the tape during handling of the magazine, a pair of tape feeding members for engaging the opposite side faces of the tape to effect movement thereof past said magnetic head while the magazine is in said operating position, one of said members being mounted for movement toward the other member to press the tape against said other member, and means for causing movement of one of said tape feeding members and a portion of the tape in said loop relative to each other and relative to the magazine in a direction transversely of the tape from a first position wherein one of said members is aligned with said tape portion so as to interfere with normal movement of the tape-carrying magazine to and from its operating position to a second position wherein said last-named one of said members is out of alignment with said tape portion so as not to interfere with such movement of the magazine.

17. Tape feeding apparatus as defined in claim 16 wherein said last-named means includes a pair of tape guides supporting said portion of the tape in said loop and mounted for vertical movement between said first and second positions.

18. Tape feeding apparatus for magnetic sound recording and/or reproducing devices having a tape-engaging magnetic head, said apparatus comprising: a removable magazine, an endless strip of magnetic-coated tape spirally-wound to form a coil in said magazine, means for guiding the tape from said coil to form a loop near the front of the magazine, a pair of tape feeding members for engaging the opposite side faces of the tape, said magazine being movable to a predetermined operating position adjacent said head wherein a portion of the tape forming said loop may be positioned between said members and against said head, and means movable relative to said magazine for causing movement of one of said tape feeding members and a portion of the tape in said loop relative to each other and relative to the magazine in upward and downward directions so that said loop does not interfere with movement of the magazine into and out of said operating position.

19. Tape feeding apparatus as defined in claim 18 wherein the means for causing relative upward and downward movement swings the tape upwardly and downwardly relative to said members and said magnetic head in response to movement of the magazine to said operating position, the tape being substantially completely enclosed by the magazine when the magazine is moved out of said operating position.

20. In a tape recording and/or reproducing device having a tape-engaging magnetic head, the combination of a removable magazine, a reel mounted in said magazine for rotation about an upright axis, a coil of endless tape mounted on said reel, means for guiding a loop of said tape forwardly generally horizontally from the innermost convolution of said coil directly to the front portion of said magazine laterally across the front portion of said magazine, and rearwardly horizontally to the outermost convolution of said coil, a pair of tape feeding members for engaging the opposite side faces of the tape in said loop near the front portion of the magazine when the magazine is in its normal operating position, means for causing movement of one of said tape feeding members and a portion of the tape in said loop vertically relative to each other and relative to the magazine so that said last-named portion of the tape clears said one of said tape feeding members as the magazine is moved horizontally from said operating position, and means for causing the tape to move into and out of engagement with said feeding members while the magazine is in said operating position.

21. In a magnetic sound recording and/or reproducing device having a tape-engaging magnetic head, means for supporting a magazine in a predetermined operating position, and means for feeding tape past said magnetic head, the combniation of a plastic magazine having mounted in the rear portion thereof a plastic tape reel comprising a plate with an upper generally horizontal coil-supporting surface and an upright axially tapered hub rigidly mounted on said plate and having a generally frusto-conical tape-engaging surface with a vertical axis centrally of said plate, said reel being mounted on the magazine for rotation about said axis and being enclosed by the magazine, a spirally-wound coil of endless tape mounted on said plate for rotation therewith and having cylindrical convolutions engaging said upper surface of said plate, the innermost tape convolution engaging said frusto-conical surface substantially throughout the circumference of said hub, means for directing the tape from the innermost to the outermost coil convolution including laterally spaced tape guides at the front corner portions of the magazine having positions directly in front of said reel for holding the side faces of the tape substantially in a vertical position and for guiding the tape directly in a transverse direction from one of said guides to the other, said tape extending forwardly directly from the innermost coil convolution to one of said guides, laterally from that guide to the other of said guides, and rearwardly directly from the last-named guide to the outermost coil convolution, said tape normally being substantially completely enclosed by the magazine, said magazine having means including a front wall in front of the laterally extending portion of the tape between said guides to prevent access to most of said laterally extending portion and to prevent accidental touching of the tape during handling of the magazine, a recess in the bottom portion of the magazine for receiving a feed roller, and an opening at the plane of said front wall to permit engagement of said laterally extending portion with a feed roller extending across the plane of said front wall.

22. The combination defined in claim 20 wherein means are provided for causing movement of one of said tape feeding members and the laterally extending portion of the tape relative to each other and relative to the magazine in a direction transversely of the tape between a first position wherein said portion of the tape is between the feed members and a second position wherein said one of said tape feeding members is below said portion of the tape while said magazine is in said operating position.

23. The combination defined in claim 20 wherein there are provided means movable relative to the magazine for causing upward and downward movement of one tape feeding member and said laterally extending portion of the tape relative to each other in response to movement of the magazine to said operating position.

24. A sound tape recording or reproducing device comprising a support, a pair of driven feed members mounted on said support and movable relative to each other into and out of tape feeding position, a reel driving roll movably mounted on said support, means for driving one of said feed members and said driving roll at fixed angular velocities with respect to each other, means for moving said driving roll into an operating position automatically upon relative movement of said feed members to tape feeding position, a magazine adapted to slide over said driving roll and one feed member into a pre-determined position, a reel mounted in the rear portion of said magazine, said reel including a circular plate mounted for rotation about a vertical axis and engageable with the periphery of said driving roll when the magazine is in said predetermined position, and means for positioning the tape between said feed members when the magazine is in said predetermined position.

25. A sound tape recording or reproducing device as defined in claim 24 wherein said reel and said circular plate are of abnormally large diameter and means is provided for limiting movement of said driving roll towards the axis of said reel so that the roll does not engage a small or normal size reel.

26. A plastic magazine having mounted in the rear portion thereof a plastic tape reel comprising a plate with an upper generally horizontal coil-supporting surface and an upright axially tapered hub rigidly mounted on said plate and having a generally frusto-conical tape-engaging surface with a vertical axis centrally of said plate, said reel being mounted on the magazine for rotation about said axis and being enclosed by the magazine, a spirally wound coil of endless tape mounted on said plate for rotation therewith and having cylindrical convolutions engaging said upper surface of said plate, the innermost tape convolution engaging said frusto-conical surface substantially throughout the circumference of said hub, and means for directing the tape from the innermost to the outermost coil convolution including laterally spaced tape guides at the front corner portions of the magazine having positions directly in front of said reel for holding the side faces of the tape substantially in a vertical position and for guiding the tape directly in a transverse direction from one of said guides to the other, said tape extending forwardly directly from the innermost coil convolution to one of said guides, laterally from that guide to the other of said guides, and rearwardly directly from the last-named guide to the outermost coil convolution, said magazine having a bottom portion and a removable upper cover portion that fit together to form an enclosure for the tape and the reel, said cover portion having a downwardly extending skirt concentric to the reel with portions of said skirt overlying the marginal portion of said plate to prevent radial outward movement of the outermost coil convolution off of said plate.

27. In a magnetic tape recording and/or reproducing device having a magnetic head and a pair of tape feeding rollers, the combination of a control member, a magazine having a tape reel mounted therein, a coil of endless tape rotatably mounted on said reel, and means for guiding the tape from the innermost convolution of the coil to the outermost convolution of the coil including a guide member spaced from said reel, said guide member being mounted for movement upwardly and downwardly and being adapted to move the tape from a retracted position wherein the tape is completely enclosed by said magazine to an advanced position wherein a substantial length of the tape is exposed for engagement with said head and said tape feeding rollers, means including a horizontal plate for guiding the magazine horizontally to a predetermined operating position wherein the tape when in said advanced position is located between said feed rollers and when in said retracted position is above one of said rollers, means responsive to movement of said control member for moving said guide relative to said magazine to cause movement of the tape from said retracted to said advanced position, and means responsive to movement of said control member for moving said feed rollers against the tape and for holding the magazine in said operating position.

28. In combination, a magazine, a reel mounted for rotation in said magazine, a strip of magnetic tape spirally wound to form a coil in said magazine, means comprising a pair of guide members in said magazine for guiding the tape from said coil and for supporting a length of the tape between them, means carried by said magazine including a front shielding wall adjacent said length of tape for preventing accidental touching of the tape during handling of the magazine, and means mounting said guide members for upward and downward movement in said magazine between upper retracted positions wherein said length of tape is enclosed and protected by said shielding wall and lower advanced positions wherein said length of tape is exposed, below said shielding wall.

29. Tape feeding apparatus for magnetic sound recording and/or reproducing devices having a magnetic head, said tape feeding apparatus comprising: a removable magazine having an operating position, a strip of magnetic tape spirally-wound to form a coil in said magazine, means in said magazine for guiding a loop of tape from said coil, a pair of tape feeding members for engaging the tape to effect movement thereof past said magnetic head while the magazine is in said operating position, one of said members being mounted for movement toward the other member to press the tape against said other member, means for causing movement of one of said tape feeding members and a portion of the tape in said loop relative to each other and relative to the magazine in a direction transversely of the tape from a first position wherein one of said members is aligned with said tape portion so as to interfere with normal movement of the tape-carrying magazine to and from its operating position to a second position wherein said last-named one of said members is out of alignment with said tape portion so as not to interfere with such movement of the magazine, a common control member, means responsive to movement of said control member for moving said feeding members into gripping engagement with the tape in said loop to cause feeding of the tape while the magazine is in said operating position, means for locking said magazine in said operating position while said feeding members are in engagement with the tape, and means responsive to movement of said control member for moving said locking means to release the magazine when the feeding members release the tape whereby the magazine may be removed from said operating position.

References Cited in the file of this patent

UNITED STATES PATENTS

| | | |
|---|---|---|
| 2,327,108 | Heyer | Aug. 17, 1943 |
| 2,699,332 | MacKeenzie | Jan. 11, 1955 |
| 2,712,448 | Schroter | July 5, 1955 |
| 2,732,144 | Jones | Jan. 24, 1956 |
| 2,778,635 | Eash | Jan. 22, 1957 |
| 2,778,637 | Eash | Jan. 22, 1957 |
| 2,778,880 | Eash | Jan. 22, 1957 |
| 2,791,423 | Eddy | May 7, 1957 |

FOREIGN PATENTS

| | | |
|---|---|---|
| 1,055,629 | France | Oct. 14, 1953 |

UNITED STATES PATENT OFFICE

CERTIFICATE OF CORRECTION

Patent No. 2,911,215 November 3, 1959

Bernard A. Cousino

It is hereby certified that error appears in the printed specification of the above numbered patent requiring correction and that the said Letters Patent should read as corrected below.

Column 46, line 5, for "combniation" read -- combination --; lines 41 and 51, for the claim reference numeral "20", each occurrence, read -- 21 --.

Signed and sealed this 26th day of April 1960.

(SEAL)
Attest:

KARL H. AXLINE
Attesting Officer

ROBERT C. WATSON
Commissioner of Patents